(12) United States Patent
Taylor et al.

(10) Patent No.: US 9,603,415 B2
(45) Date of Patent: Mar. 28, 2017

(54) FLUID-FILLED CHAMBER WITH A TENSILE ELEMENT

(71) Applicant: NIKE, Inc., Beaverton, OR (US)

(72) Inventors: Danielle L. Taylor, Portland, OR (US); James C. Meschter, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 14/713,157

(22) Filed: May 15, 2015

(65) Prior Publication Data
US 2015/0245687 A1  Sep. 3, 2015

Related U.S. Application Data

(62) Division of application No. 13/840,087, filed on Mar. 15, 2013.

(51) Int. Cl.
*A43B 13/18* (2006.01)
*A43B 13/20* (2006.01)
(Continued)

(52) U.S. Cl.
CPC .............. *A43B 13/20* (2013.01); *A43B 13/12* (2013.01); *A43B 13/16* (2013.01); *A43B 13/18* (2013.01); *A43B 13/185* (2013.01); *A43B 13/188* (2013.01); *A43B 13/189* (2013.01); *A43B 13/42* (2013.01); *A43B 21/26* (2013.01); *A43B 21/265* (2013.01); *A43B 21/28* (2013.01);
(Continued)

(58) Field of Classification Search
CPC ..... A43B 13/188; A43B 13/20; A43B 13/189; A43B 13/42; A43B 21/265; A43B 21/28

USPC .............................................. 36/29, 28, 25 R
See application file for complete search history.

(56) References Cited

U.S. PATENT DOCUMENTS 2,677,906 A * 5/1954 Reed ...................... A43B 17/03
 12/146 B
4,219,945 A * 9/1980 Rudy .................... A43B 13/206
 36/29
(Continued)

FOREIGN PATENT DOCUMENTS

| CN | 1600191 A | 3/2005 |
|---|---|---|
| CN | 101632502 A | 1/2010 |

(Continued)

OTHER PUBLICATIONS

Steven B. Warner, Fiber Science, 1995, Prentice-Hall, p. 127.
(Continued)

*Primary Examiner* — Clinton T Ostrup
*Assistant Examiner* — Cameron A Carter
(74) *Attorney, Agent, or Firm* — Honigman Miller Schwartz and Cohn LLP; Mathew H. Szalach; Jonathan P. O'Brien

(57) ABSTRACT

A fluid-filled chamber, which may be incorporated into articles of footwear and other products, may include an outer barrier and a tensile element. The outer barrier may have a first portion, an opposite second portion, and an interior surface defining an interior void. The tensile element may be secured to the first portion of the outer barrier in a plurality of first bond areas and may be secured to the second portion of the outer barrier in a plurality of second bond areas. Each of the bond areas may be connected to portions of the tensile element spaced from the interior surface.

17 Claims, 27 Drawing Sheets

(51) Int. Cl.
| | |
|---|---|
| A43B 13/12 | (2006.01) |
| A43B 13/14 | (2006.01) |
| A43B 21/32 | (2006.01) |
| A43B 21/26 | (2006.01) |
| A43B 21/28 | (2006.01) |
| A43B 13/16 | (2006.01) |
| A43B 13/42 | (2006.01) |
| B29D 35/14 | (2010.01) |
| B29D 35/12 | (2010.01) |

(52) U.S. Cl.
CPC ............ *A43B 21/32* (2013.01); *B29D 35/122* (2013.01); *B29D 35/128* (2013.01); *B29D 35/148* (2013.01)

(56) References Cited

U.S. PATENT DOCUMENTS

| | | | |
|---|---|---|---|
| 4,445,283 A | 5/1984 | Meyers | |
| 4,999,931 A * | 3/1991 | Vermeulen | A43B 13/185 36/153 |
| 5,572,804 A * | 11/1996 | Skaja | A43B 13/181 36/28 |
| 5,741,568 A | 4/1998 | Rudy | |
| 5,802,739 A * | 9/1998 | Potter | A43B 21/28 36/29 |
| 5,987,781 A * | 11/1999 | Pavesi | A43B 13/20 36/29 |
| 6,029,962 A * | 2/2000 | Shorten | A43B 13/181 267/145 |
| 6,098,313 A | 8/2000 | Skaja | |
| 6,367,174 B1 | 4/2002 | Shibata | |
| 6,374,514 B1 * | 4/2002 | Swigart | C10L 9/083 34/381 |
| 6,385,864 B1 * | 5/2002 | Sell, Jr. | H01L 21/67034 134/31 |
| 6,402,879 B1 * | 6/2002 | Tawney | B27D 1/04 156/264 |
| 6,675,500 B1 * | 1/2004 | Cadamuro | A43B 1/0018 36/27 |
| 6,751,892 B2 | 6/2004 | Chavet et al. | |
| 6,964,119 B2 | 11/2005 | Weaver, III | |
| 8,312,646 B2 * | 11/2012 | Meschter | A43B 3/26 36/45 |
| 8,747,593 B2 * | 6/2014 | Chao | B32B 38/10 12/146 B |
| 2005/0167029 A1 * | 8/2005 | Rapaport | A43B 13/187 156/145 |
| 2005/0183287 A1 * | 8/2005 | Schindler | A43B 13/187 36/29 |
| 2006/0230636 A1 | 10/2006 | Kokstis et al. | |
| 2007/0063368 A1 * | 3/2007 | Schindler | A43B 13/187 264/45.1 |
| 2007/0084082 A1 | 4/2007 | Dojan et al. | |
| 2007/0169379 A1 * | 7/2007 | Hazenberg | A43B 13/125 36/102 |
| 2008/0066342 A1 * | 3/2008 | Park | A43B 7/144 36/29 |
| 2008/0086916 A1 * | 4/2008 | Ellis | A43B 7/1425 36/103 |
| 2008/0250673 A1 * | 10/2008 | Andrews | A43B 13/12 36/25 R |
| 2008/0276490 A1 * | 11/2008 | Holt | A43B 13/20 36/28 |
| 2009/0013558 A1 * | 1/2009 | Hazenberg | A43B 1/0009 36/88 |
| 2009/0045547 A1 * | 2/2009 | Schindler | A43B 13/20 264/241 |
| 2009/0151195 A1 * | 6/2009 | Forstrom | A43B 13/20 36/29 |
| 2009/0178300 A1 * | 7/2009 | Parker | A43B 13/14 36/29 |
| 2009/0178301 A1 | 7/2009 | Dojan et al. | |
| 2010/0101111 A1 * | 4/2010 | McDonnell | A43B 1/0054 36/29 |
| 2010/0325914 A1 * | 12/2010 | Peyton | A43B 7/144 36/29 |
| 2011/0131831 A1 * | 6/2011 | Peyton | A43B 13/20 36/29 |
| 2011/0271552 A1 * | 11/2011 | Peyton | A43B 13/20 36/29 |
| 2011/0277347 A1 * | 11/2011 | Monfils | A43B 13/189 36/29 |
| 2011/0277916 A1 * | 11/2011 | Beye | A43B 13/20 156/145 |
| 2012/0042539 A1 * | 2/2012 | Miner | A43B 13/141 36/29 |
| 2012/0048663 A1 * | 3/2012 | McDonnell | A43B 1/0054 188/266 |
| 2012/0102782 A1 * | 5/2012 | Swigart | A43B 13/20 36/83 |
| 2012/0174432 A1 * | 7/2012 | Peyton | A43B 13/125 36/28 |
| 2012/0204451 A1 * | 8/2012 | De Roode | A43B 7/144 36/114 |
| 2012/0233878 A1 * | 9/2012 | Hazenberg | A43B 13/20 36/29 |
| 2012/0233879 A1 * | 9/2012 | Dojan | A43B 13/20 36/29 |
| 2012/0260526 A1 * | 10/2012 | Smith | A43B 9/02 36/83 |
| 2013/0276329 A1 | 10/2013 | James | |
| 2014/0208612 A1 | 7/2014 | Dirsa et al. | |
| 2015/0013190 A1 * | 1/2015 | Davison | A43B 13/189 36/102 |

FOREIGN PATENT DOCUMENTS

| | | |
|---|---|---|
| EP | 0135828 A2 | 4/1985 |
| JP | H05503865 A | 6/1993 |
| JP | 2009514575 A | 4/2009 |
| KR | 100611822 B1 | 8/2006 |
| KR | 20110070974 A | 6/2011 |
| WO | WO-0170064 A2 | 9/2001 |

OTHER PUBLICATIONS

International Search Report and Written Opinion, mailed Oct. 22, 2014 for PCT Application No. PCT/US2014/025182.
State Intellectual Property Office, First Office Action for CN Application No. 201480015424.3, mailed Jun. 27, 2016.
Japan Patent Office, Notice of Reasons for Rejection for JP Application No. 2016-501777, mailed Oct. 24, 2016.
Korean Patent Office, Office Action for KR Application No. 10-2015-7029320, mailed Oct. 27, 2016.
State Intellectual Property Office, Second Office Action for CN Application No. 201480015424.3, mailed Jan. 9, 2017.

* cited by examiner

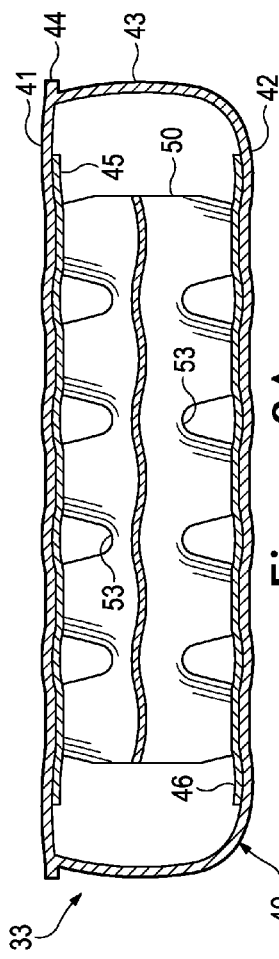
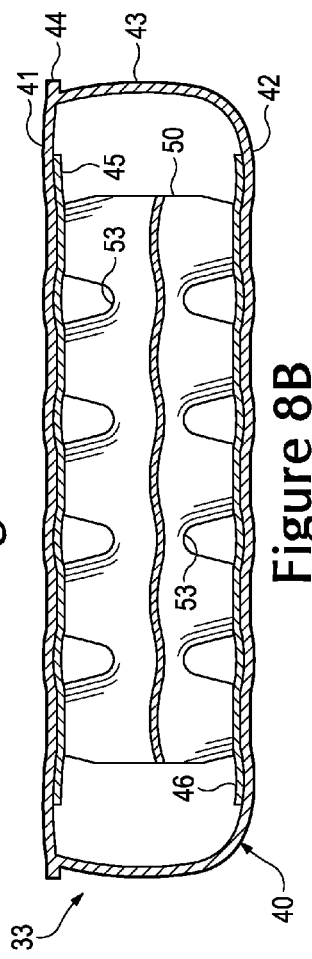
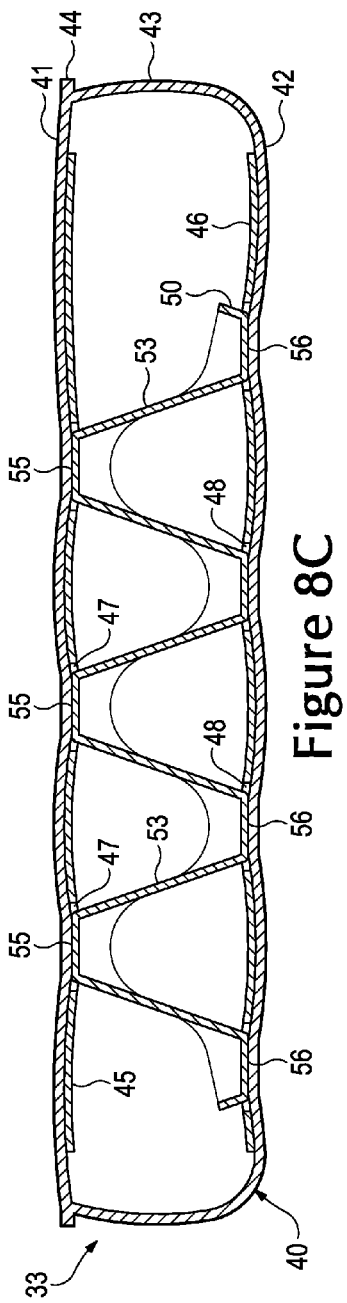

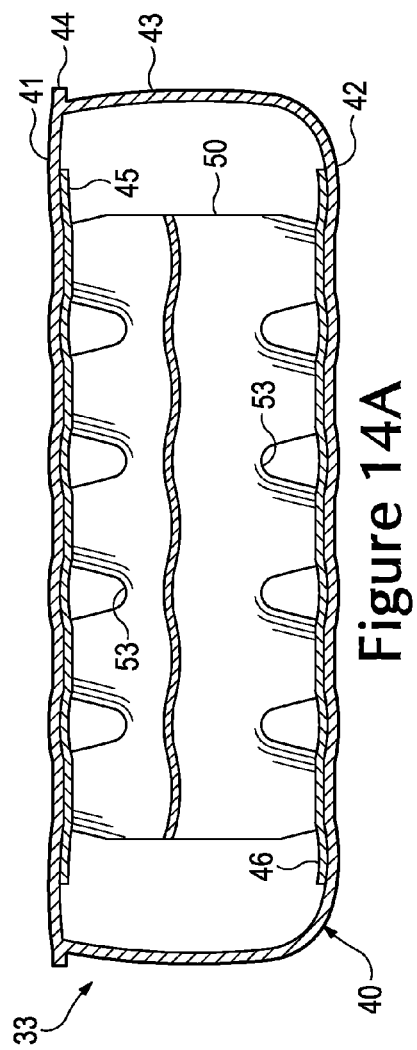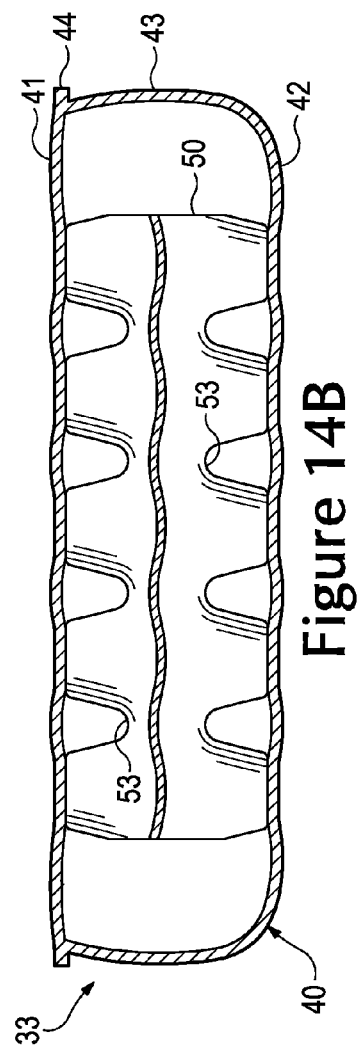

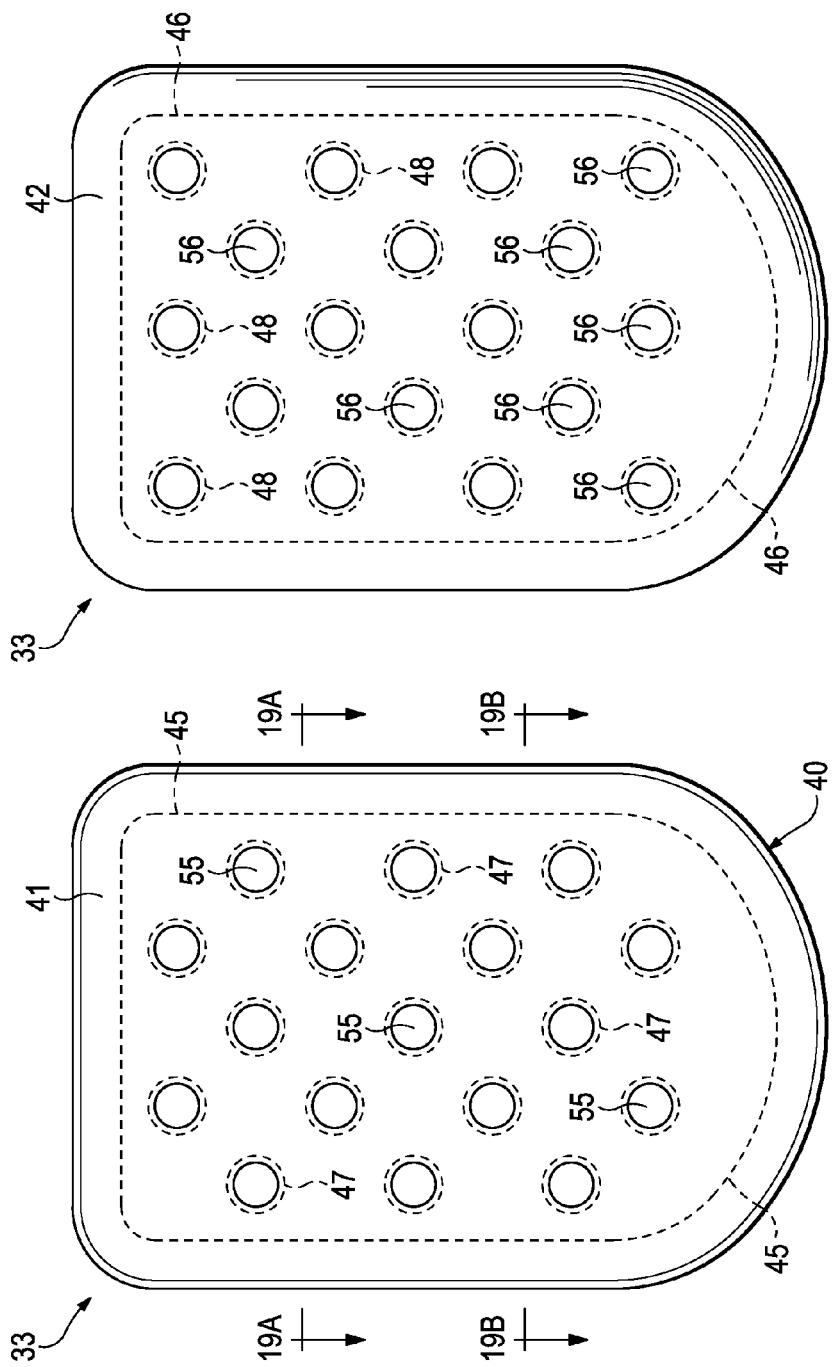

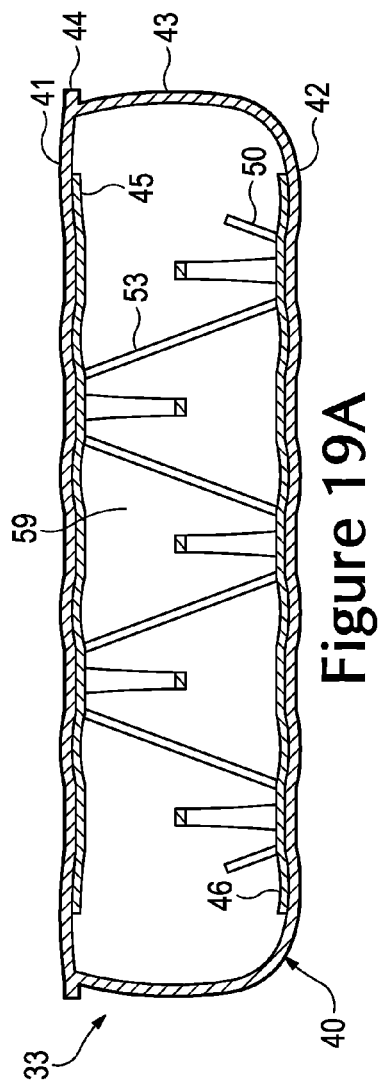
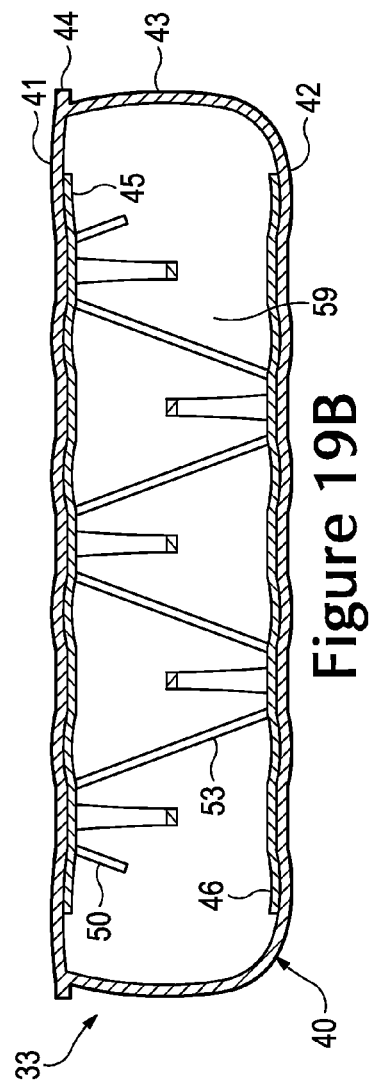

FLUID-FILLED CHAMBER WITH A TENSILE ELEMENT

CROSS-REFERENCE TO RELATED APPLICATIONS

This application is a divisional of U.S. patent application Ser. No. 13/840,087, filed Mar. 15, 2013, the entire contents of which are hereby incorporated by reference.

BACKGROUND

Articles of footwear generally include two primary elements, an upper and a sole structure. The upper is formed from a variety of material elements (e.g., textiles, foam, leather, and synthetic leather) that are stitched or adhesively bonded together to form a void on the interior of the footwear for comfortably and securely receiving a foot. An ankle opening through the material elements provides access to the void, thereby facilitating entry and removal of the foot from the void. In addition, a lace is utilized to modify the dimensions of the void and secure the foot within the void.

The sole structure is located adjacent to a lower portion of the upper and is generally positioned between the foot and the ground. In many articles of footwear, including athletic footwear, the sole structure generally incorporates an insole, a midsole, and an outsole. The insole, which may be located within the void and adjacent to a lower surface of the void, is a thin compressible member that enhances footwear comfort. The midsole, which may be secured to a lower surface of the upper and extends downward from the upper, forms a middle layer of the sole structure. In addition to attenuating ground reaction forces (i.e., providing cushioning for the foot), the midsole may limit foot motions or impart stability, for example. The outsole, which may be secured to a lower surface of the midsole, forms at least part of the ground-contacting portion of the footwear and is usually fashioned from a durable and wear-resistant material that includes texturing to improve traction.

Generally, the midsole is primarily formed from a foamed polymer material, such as polyurethane or ethylvinylacetate, that extends throughout a length and width of the footwear. In some articles of footwear, the midsole may include a variety of additional footwear elements that enhance the comfort or performance of the footwear, including plates, moderators, fluid-filled chambers, lasting elements, or motion control members. In some configurations, any of these additional footwear elements may be located between the midsole and either of the upper and the outsole, may be embedded within the midsole, or may be encapsulated by the foamed polymer material of the midsole, for example. Although many midsoles are primarily formed from a foamed polymer material, fluid-filled chambers or other non-foam structures may form part of or a majority of some midsole configurations.

Various techniques may be utilized to form fluid-filled chambers for articles of footwear or other products, including a two-film technique, a thermoforming technique, and a blowmolding technique, for example. In the two-film technique, two separate polymer sheets are bonded together at specific locations. The thermoforming technique is similar to the two-film technique in that two polymer sheets are bonded together, but also includes utilizing a heated mold to form or otherwise shape the polymer sheets. In the blowmolding technique, a parison formed from a molten or otherwise softened polymer material is placed within a mold having a cavity with the desired configuration of the chamber. Pressurized air induces the polymer material to conform to surfaces of the cavity. The polymer material then cools and retains the shape of the cavity, thereby forming the chamber.

Following each of the techniques discussed above, the chambers are pressurized. That is, a pressurized fluid is injected into the chambers and then sealed within the chambers. One method of pressurization involves forming inflation conduits in residual portions of the polymer sheets or the parison. In order to pressurize the chambers, the fluid is injected through the inflation conduits, which are then sealed. The residual portions of the polymer sheets or the parison, including the inflation conduits, are then trimmed or otherwise removed to substantially complete manufacture of the chambers.

SUMMARY

Various features of fluid-filled chambers and methods of manufacturing fluid-filled chambers are disclosed below. In one configuration, A fluid-filled chamber comprises a barrier and a tensile element. The barrier is formed of a polymer material that defines an interior void and has a first portion, a second portion, and a sidewall portion. The first portion forms a first surface of the chamber. The second portion is located opposite the first portion and forms a second surface of the chamber. The sidewall portion that extends between the first portion and the second portion to form a sidewall surface of the chamber. The tensile element is located within the interior void. The tensile element is spaced inward from the sidewall portion. The tensile element is (a) secured to the first portion of the barrier in a plurality of discrete first bond areas and (b) secured to the second portion of the barrier in a plurality of discrete second bond areas. Each of the first bond areas and second bond areas is substantially surrounded by unbonded portions of the tensile element.

In another configuration, a fluid-filled chamber comprises a barrier and a tensile layer. The barrier is formed of a polymer material that defines an interior void and has a first portion, a second portion, and a sidewall portion. The first portion forms a first surface of the chamber. The second portion is located opposite the first portion and forms a second surface of the chamber. The sidewall portion extends between the first portion and the second portion to form a sidewall surface of the chamber. The tensile layer is located within the interior void. The tensile layer is spaced inward from the sidewall portion. The tensile layer has a length, a width, and a configuration of a sheet that is secured to (a) the first portion of the barrier in a plurality of first bond areas and (b) the second portion of the barrier in a plurality of second bond areas. Each of the first bond areas and second bond areas is spaced from the other first bond areas and second bond areas along both the length and the width of the tensile layer.

In a further configuration, a fluid-filled chamber comprises a barrier, a bond inhibitor, a tensile layer, and a fluid. The barrier is formed of a polymer material that defines an interior void. The bond inhibitor is located adjacent to an inner surface of the barrier and has a plurality of apertures. The tensile layer is located within the interior void. The tensile layer is spaced inward from a periphery of the barrier. The tensile layer has a configuration of a sheet extending through the plurality of apertures, being secured to the barrier at a plurality of bonded areas, and having an unbonded area substantially surrounding each of bonded areas. The fluid is located within the interior void and is pressurized to place the unbonded area of the tensile element in tension.

In yet another configuration, a method of manufacturing an article of footwear comprises steps of locating, compressing, bonding, pressurizing, and incorporating. In one step, the method includes locating a first polymer layer, a second polymer layer, and a tensile layer between two mold portions. The tensile layer is positioned between the first polymer layer and the second polymer layer. In another step, the method includes compressing the first polymer layer, the second polymer layer, and the tensile layer between the mold portions to form a plurality of discrete and spaced bonds between the tensile layer and each of the first polymer layer and the second polymer layer. In another step, the method includes bonding the first polymer layer to the second polymer layer around a periphery spaced from the tensile layer to form an interior void. In another step, the method includes pressurizing the interior void to space areas of the tensile layer located between the bonds from the first polymer layer and the second polymer layer. In another step, the method includes incorporating the chamber into a sole structure of the article of footwear.

The advantages and features of novelty characterizing aspects of the invention are pointed out with particularity in the appended claims. To gain an improved understanding of the advantages and features of novelty, however, reference may be made to the following descriptive matter and accompanying figures that describe and illustrate various configurations and concepts related to the invention.

FIGURE DESCRIPTIONS

The foregoing Summary and the following Detailed Description will be better understood when read in conjunction with the accompanying figures.

FIGS. 8A-8C are a cross-sectional views of the chamber, as defined by section lines 8A through 8C in FIG. 5.

FIGS. 14A and 14B are cross-sectional views corresponding with FIG. 8A and depicting further configurations of the chamber.

FIG. 17 is a top plan view corresponding with FIG. 5 and depicting the further configuration of the chamber of FIG. 16.

FIG. 18 is a bottom plan view corresponding with FIG. 6 and depicting the further configuration of the chamber of FIG. 16.

FIGS. 19A and 19B are cross-sectional views of the further configuration of the chamber of FIG. 16, as defined by section lines 19A and 19B in FIG. 17.

DETAILED DESCRIPTION

The following discussion and accompanying figures disclose various configurations of fluid-filled chambers and methods for manufacturing the chambers. Although the chambers are disclosed with reference to footwear having a configuration that is suitable for running, concepts associated with the chambers may be applied to a wide range of athletic footwear styles, including basketball shoes, cross-training shoes, football shoes, golf shoes, hiking shoes and boots, ski and snowboarding boots, soccer shoes, tennis shoes, and walking shoes, for example. Concepts associated with the chambers may also be utilized with footwear styles that are generally considered to be non-athletic, including dress shoes, loafers, and sandals. In addition to footwear, the chambers may be incorporated into other types of apparel and athletic equipment, including helmets, gloves, and protective padding for sports such as football and hockey. Similar chambers may also be incorporated into cushions and other compressible structures utilized in household goods and industrial products. Accordingly, chambers incorporating the concepts disclosed herein may be utilized with a variety of products.

General Footwear Structure

Figure 1:
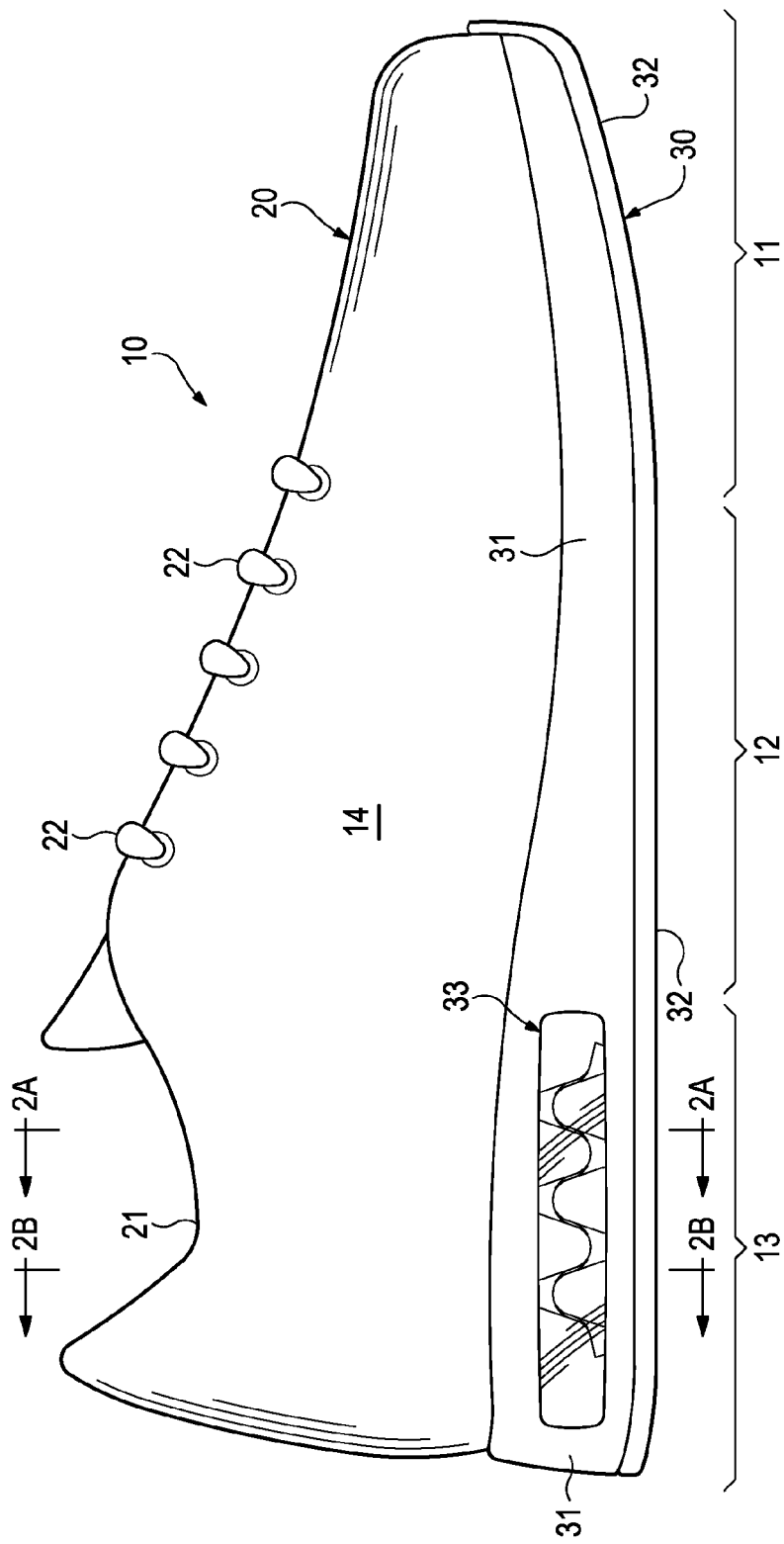
FIG. 1 is a lateral side elevational view of an article of footwear.
Figure 2A:
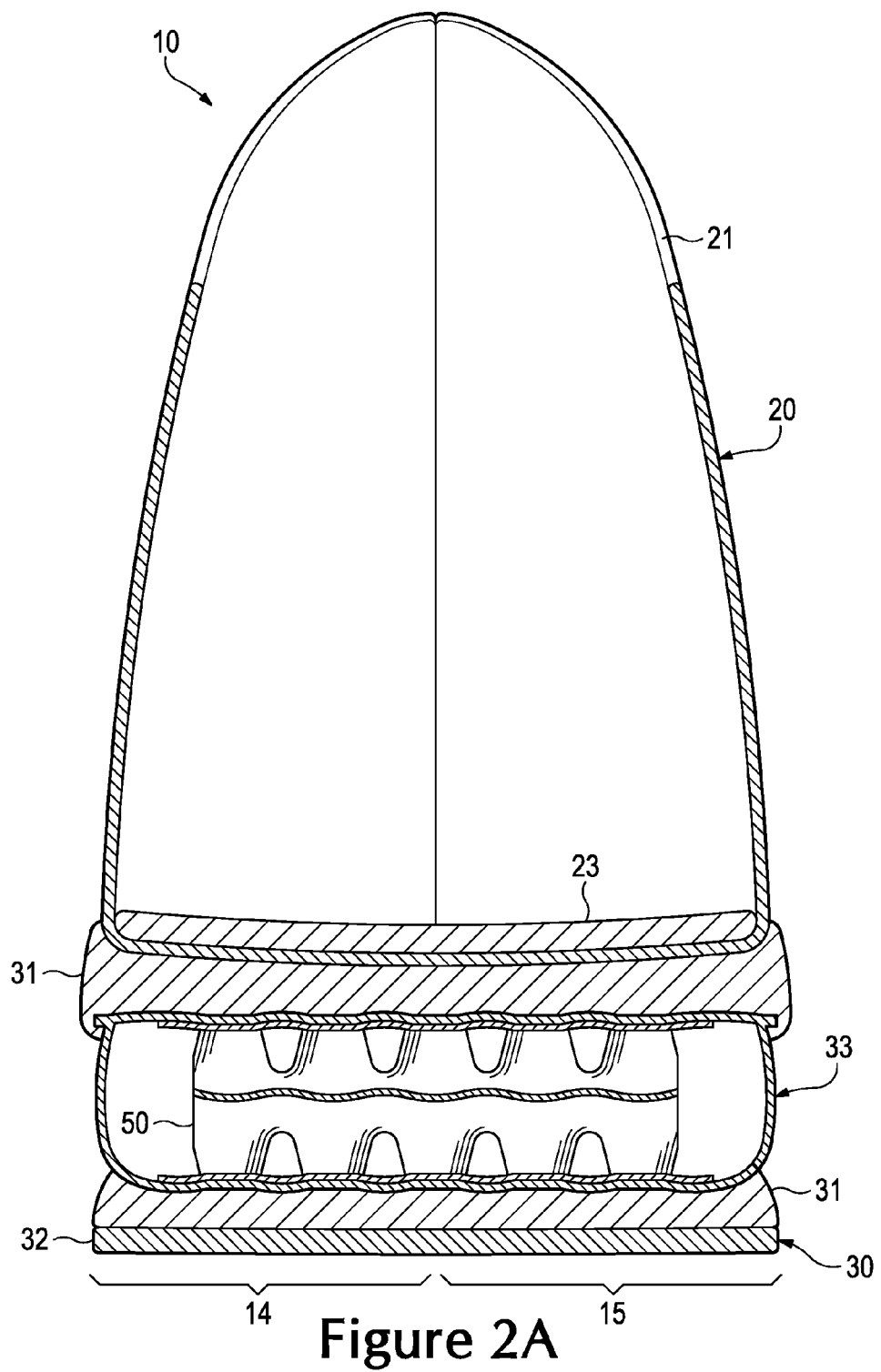
FIGS. 2A-2B are a cross-sectional views of the article of footwear, as defined by section lines 2A and 2B in FIG. 1.
Figure 2B:
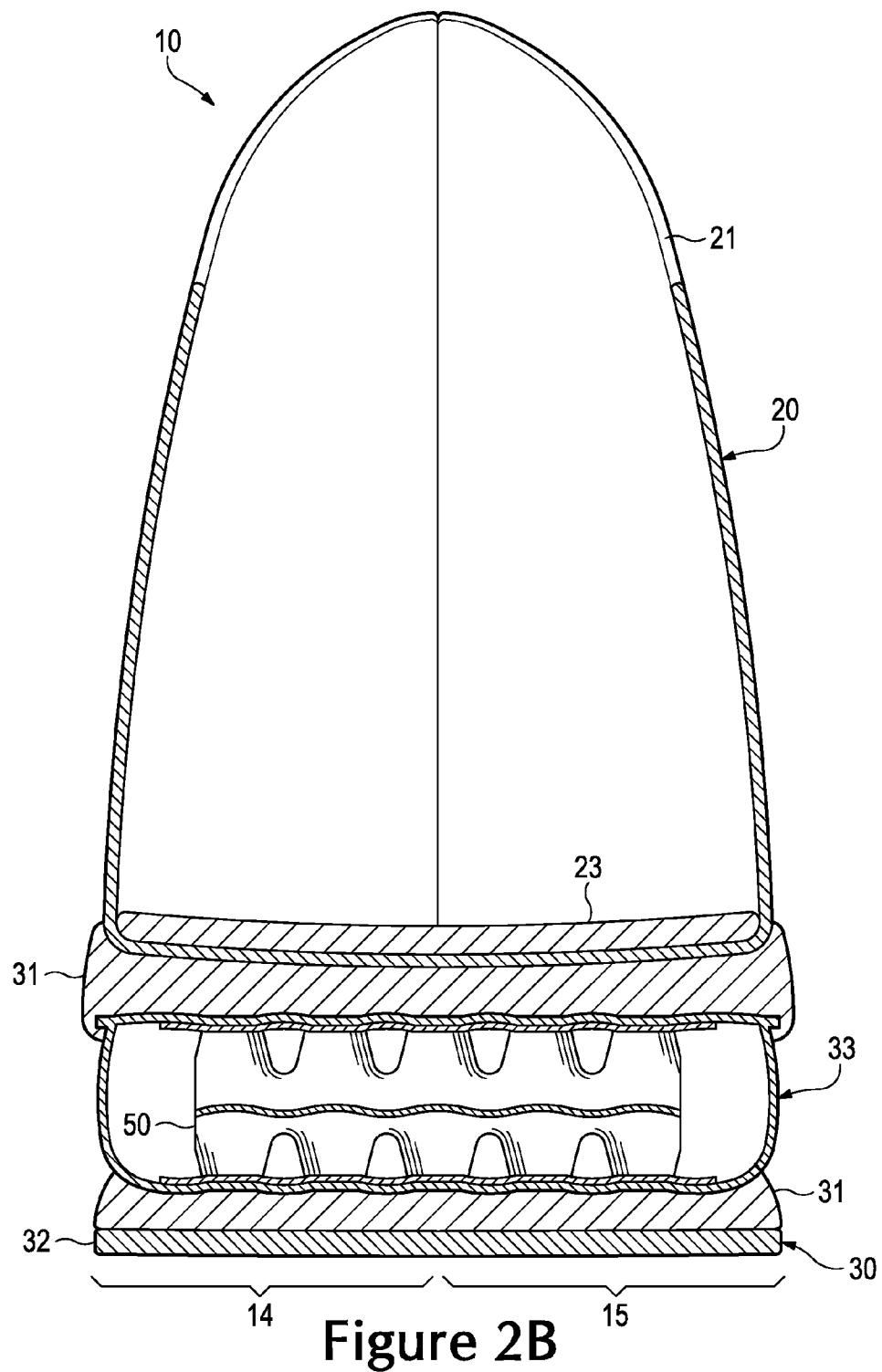
Figure 3:
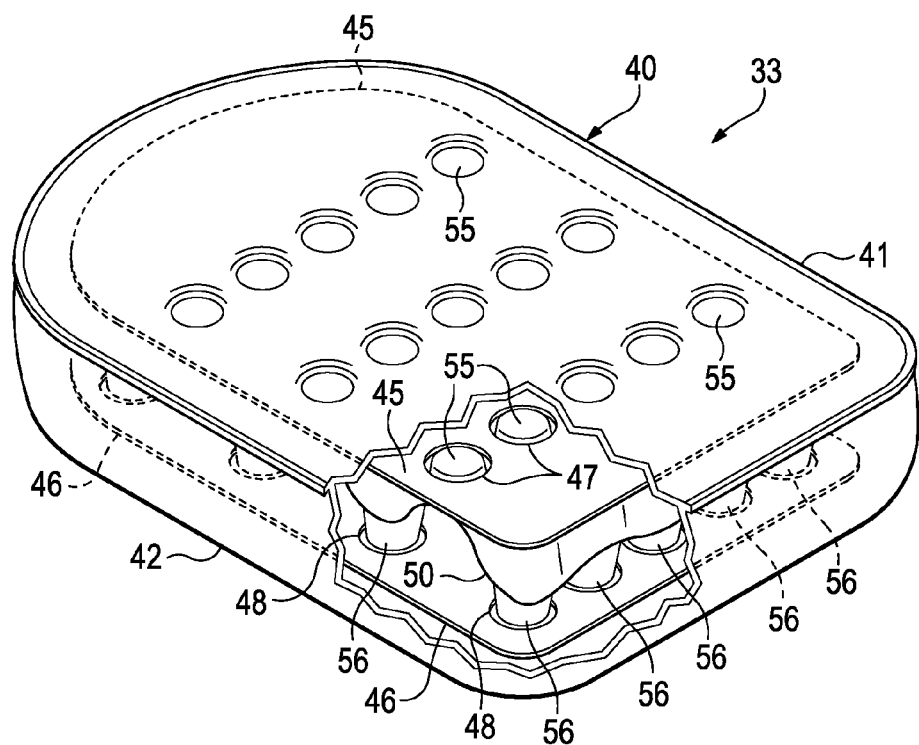
FIG. 3 is a perspective view of a fluid-filled chamber from the article of footwear.
Figure 4:
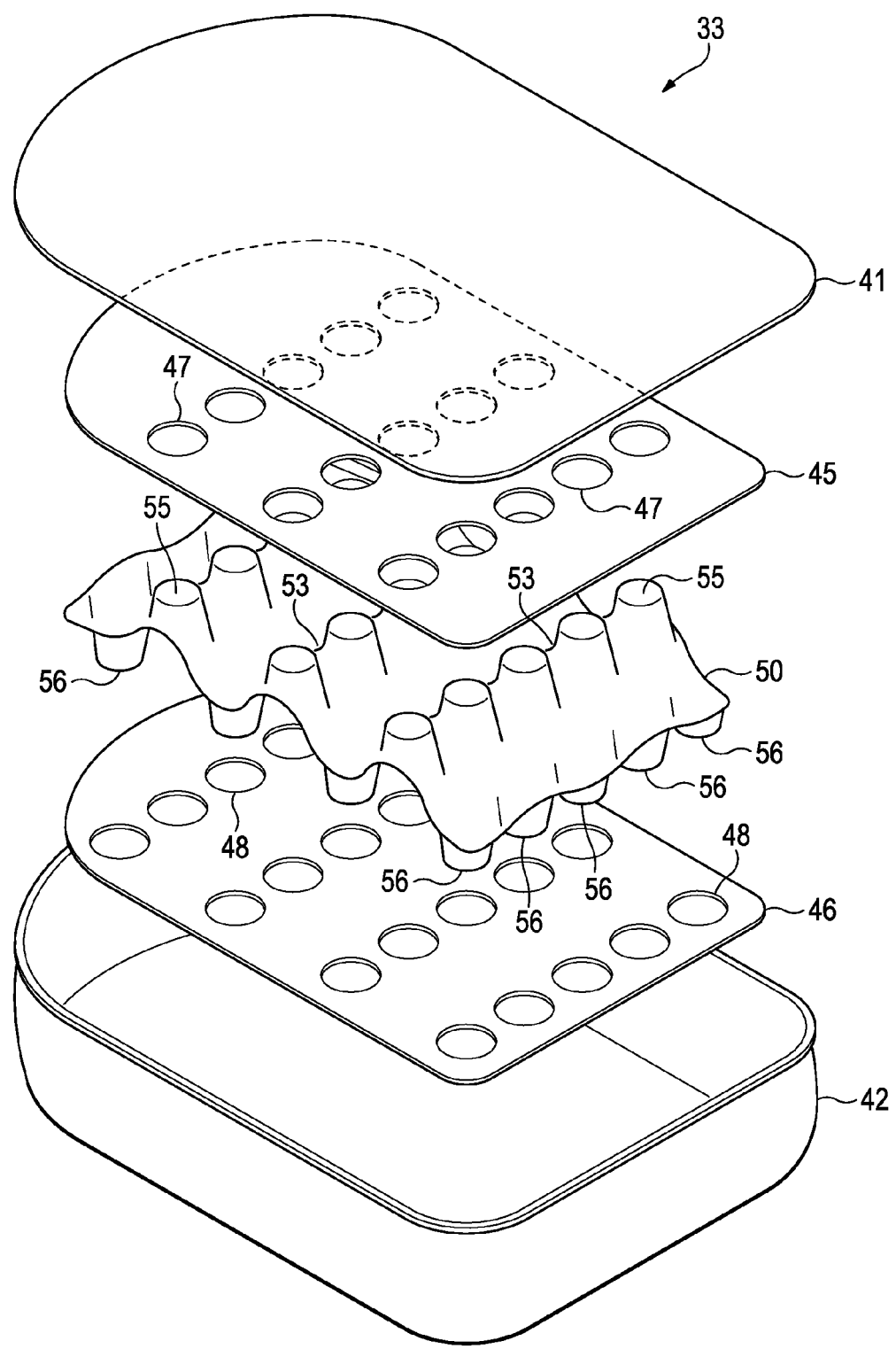
FIG. 4 is an exploded perspective view of the chamber.
Figure 6:
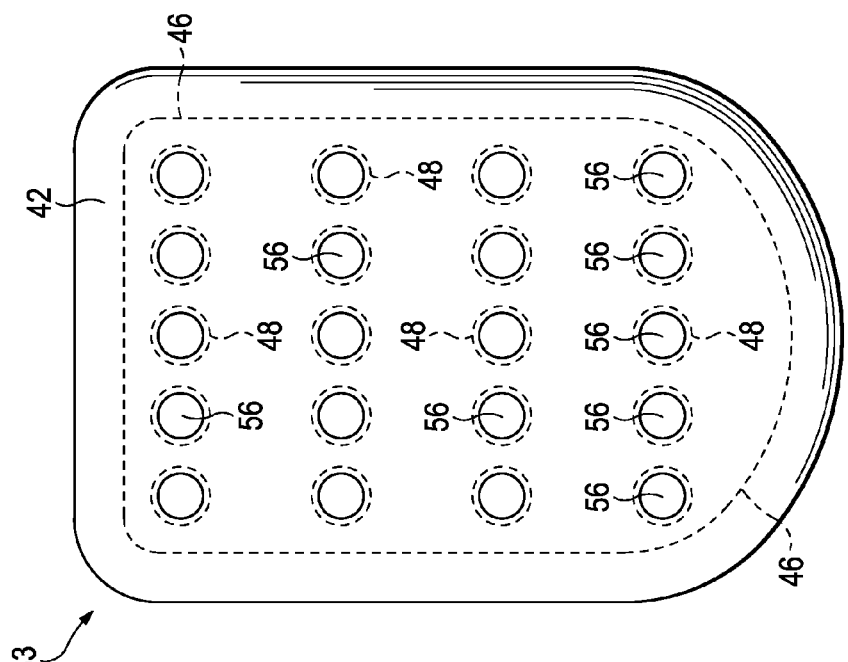
FIG. 6 is a bottom plan view of the chamber.
Figure 5:
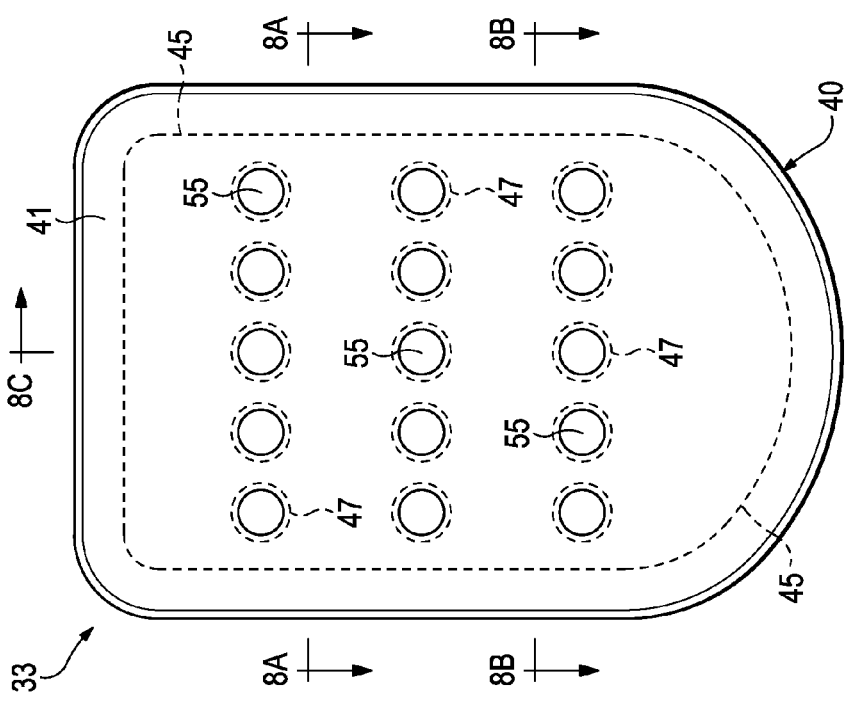
FIG. 5 is a top plan view of the chamber.
Figure 7:
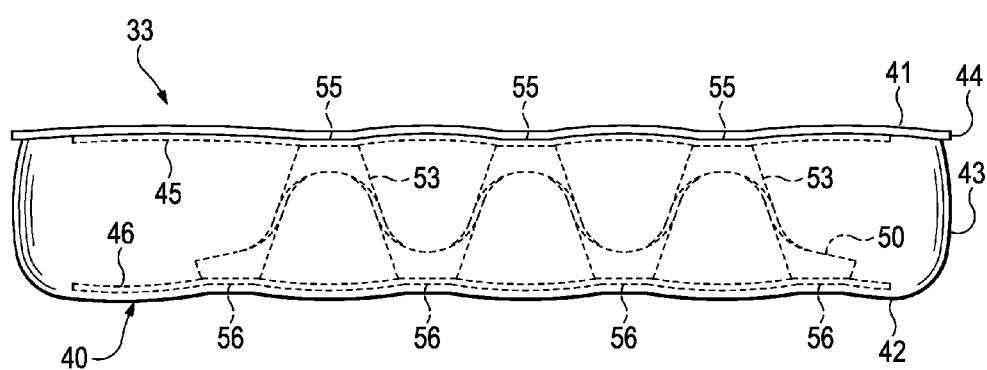
FIG. 7 is a lateral side elevational view of the chamber.

An article of footwear 10 is depicted in FIGS. 1-2B as including an upper 20 and a sole structure 30. For reference purposes, footwear 10 may be divided into three general regions: a forefoot region 11, a midfoot region 12, and a heel region 13. Forefoot region 11 generally includes portions of footwear 10 corresponding with the toes and the joints connecting the metatarsals with the phalanges. Midfoot region 12 generally includes portions of footwear 10 corresponding with the arch area of the foot. Heel region 13 generally includes portions of footwear 10 corresponding with rear portions of the foot, including the calcaneus bone. Regions 11-13 are not intended to demarcate precise areas of footwear 10. Rather, regions 11-13 are intended to represent general areas of footwear 10 to aid in the following discussion. In addition to being applied to footwear 10, regions 11-13 may also be applied to upper 20, sole structure 30, and individual elements thereof.

Footwear 10 also includes a lateral side 14 and a medial side 15. More particularly, lateral side 14 corresponds with an outside area of the foot (i.e. the surface that faces away from the other foot), and medial side 15 corresponds with an inside area of the foot (i.e., the surface that faces toward the other foot). Lateral side 14 and medial side 15 also extend through each of regions 11-13 and correspond with opposite sides of footwear 10. As with regions 11-13, sides 14 and 15 represent general areas of footwear 10 to aid in the following discussion, and may also be applied to upper 20, sole structure 30, and individual elements thereof in addition to being applied to footwear 10.

Upper 20 is depicted as having a substantially conventional configuration incorporating a plurality of material elements (e.g., textile, foam, leather, and synthetic leather) that are stitched, adhered, bonded, or otherwise joined together to form an interior void for securely and comfortably receiving a foot. The material elements may be selected and located with respect to upper 20 in order to selectively impart various properties to upper 20, such as durability, air-permeability, wear-resistance, flexibility, and comfort. An ankle opening 21 in heel region 13 provides access to the interior void. In addition, upper 20 may include a lace 22 that is utilized in a conventional manner to modify the dimensions of the interior void, thereby securing the foot within the interior void and facilitating entry and removal of the foot from the interior void. Lace 22 may extend through apertures in upper 20, and a tongue portion of upper 20 may extend between the interior void and lace 22. Upper 20 may also incorporate a sockliner 23 that is located within the void in upper 20 and adjacent a plantar (i.e., lower) surface of the foot to enhance the comfort of footwear 10. Given that various aspects of the present application primarily relate to sole structure 30, upper 20 may exhibit the general configuration discussed above or the general configuration of practically any other conventional or non-conventional upper. Accordingly, the overall structure of upper 20 may vary significantly.

Sole structure 30 is secured to upper 20 and has a configuration that extends between upper 20 and the ground. In effect, therefore, sole structure 30 is located to extend between the foot and the ground. In addition to attenuating ground reaction forces (such as by providing cushioning for the foot), sole structure 30 may provide traction, impart stability, and limit various foot motions, such as pronation.

The primary elements of sole structure 30 are a midsole 31 and an outsole 32. Midsole 31 may incorporate a polymer foam material, such as polyurethane or ethylvinylacetate. Midsole 31 may also incorporate a fluid-filled chamber 33. In addition to the polymer foam material and chamber 33, midsole 31 may incorporate one or more other footwear elements that enhance the comfort, performance, or ground reaction force attenuation properties of footwear 10, including plates, moderators, lasting elements, or motion control members.

Outsole 32, which may be absent in some configurations of footwear 10, is depicted as being secured to a lower surface of midsole 31 and forms at least part of a ground-contacting surface of footwear 10. Outsole 32 may be formed from a rubber material that provides a durable and wear-resistant surface for engaging the ground. In addition, outsole 32 may also be textured to enhance the traction (i.e., friction) properties between footwear 10 and the ground. In various other configurations of footwear 10, and depending upon the manner in which midsole 31 incorporates the polymer foam material, chamber 33, or both, outsole 32 may be secured to the polymer foam material alone, to chamber 33 alone, or to both the polymer foam material and chamber 33. In some configurations, outsole 32 may be absent from footwear 10.

Chamber 33 is depicted as having a shape that fits within a perimeter of midsole 31 and is depicted as being primarily located in heel region 13. Accordingly, when the foot is located within upper 20, chamber 33 extends under a heel area of the foot (for example, under a calcaneus bone of the wearer) in order to attenuate ground reaction forces that are generated when sole structure 30 is compressed between the foot and the ground during various ambulatory activities, such as running and walking. In various other configurations, chamber 33 may extend through alternate portions of footwear 10. For example, chamber 33 may extend only through forefoot region 11, or only through midfoot region 12, or through substantially all of footwear 10 (i.e., from forefoot region 11 to heel region 13 and also from lateral side 14 to medial side 15). Alternatively, chamber 33 may extend only through lateral side 14 of footwear 10, or only through medial side 15 of footwear 10. Chamber 33 may also extend through any combination of regions and sides. In other words, in various configurations, chamber 33 may extend through any portion or portions of footwear 10.

Chamber 33 is also depicted as being partially encapsulated within polymer foam material of midsole 31 and secured to the polymer foam material. In various other configurations of footwear 10, however, midsole 31 may otherwise incorporate chamber 33. For example, chamber 33 may be substantially surrounded by or entirely encapsulated within the polymer foam material of midsole 31, or may be above the polymer foam material, or may be below the polymer foam material, or may be between layers or regions of one or more polymer foam materials. As an example, portions of chamber 33 may form an upper or lower surface of midsole 31. In some configurations, the polymer foam material of midsole 31 may be absent and chamber 33 may be secured to both upper 20 and outsole 32.

Moreover, while a sidewall of midsole 31 is depicted as being formed partially by the polymer foam material of midsole 31 and partially by portions of chamber 33, the sidewall may be otherwise formed in various other configurations of footwear 10. For example, the sidewall of midsole 31 may be formed substantially entirely by the polymer foam material of midsole 31. In further configurations, the sidewall of midsole 31 may be substantially entirely formed by exposed portions of chamber 33.

Additionally, in various configurations, chamber 33 may contact or be secured to one or more other footwear elements within midsole 31, such as plates, moderators, lasting elements, or motion control members. Accordingly, the overall shape of chamber 33 and the manner in which chamber 33 is incorporated into footwear 10 may vary significantly.

Furthermore, although chamber 33 is depicted and discussed as being a sealed chamber within footwear 10, chamber 33 may also be a component of a fluid system within footwear 10. More particularly, pumps, conduits, and valves may be joined with chamber 33 to provide a fluid system that pressurizes chamber 33 with air from the exterior of footwear 10 or a reservoir within footwear 10. In some configurations, chamber 33 may incorporate a valve or other structure that permits an individual, such as a wearer, to adjust the pressure of the fluid. As examples, chamber 33 may be utilized in combination with any of the fluid systems disclosed in U.S. Pat. No. 7,210,249 to Passke, et al. and U.S. Pat. No. 7,409,779 to Dojan, et al, including fluid systems that vary the pressure within chamber 33 depending upon, for example, the running style or weight of the wearer.

Chamber Configuration

Chamber 33 is depicted individually in FIGS. 3-8C as having a configuration that is suitable for footwear applications. The primary elements of chamber 33 are a barrier 40, a first bond inhibitor 45, a second bond inhibitor 46, and a tensile element 50.

Discussion of Barrier

Barrier 40 (a) forms an exterior of chamber 33, (b) defines an interior void that receives a pressurized fluid, bond inhibitors 45 and 46, and tensile element 50, and (c) provides a durable sealed barrier for retaining the pressurized fluid within chamber 33. An exterior surface of barrier 40 forms an outer surface of chamber 33, and an interior surface of barrier 40 defines the interior void. The polymer material of barrier 40 includes (a) a first barrier portion 41 oriented toward upper 20, which may form an upper portion of barrier 40, (b) an opposite second barrier portion 42 oriented toward outsole 32, which may form a lower portion of barrier 40, and (c) a sidewall portion 43 that extends around a periphery of chamber 33 and between barrier portions 41 and 42, and (d) a peripheral bond 44 that joins a periphery of first barrier portion 41 to a periphery of second barrier portion 42.

A first sheet of polymer material may be used to form first barrier portion 41, while a second sheet of polymer material may be used to form second barrier portion 42 and sidewall portion 43. A wide range of polymer materials may be utilized for barrier 40. In selecting materials for barrier 40, engineering properties of the materials (e.g., tensile strength, stretch properties, fatigue characteristics, dynamic modulus, and loss tangent) as well as the ability of the materials to prevent the diffusion of the fluid contained by barrier 40 may be considered. When formed of thermoplastic urethane, for example, barrier 40 may have a thickness of approximately 1.0 millimeter, but the thickness may range from less than 0.25 to more than 2.0 millimeters, for example. In addition to thermoplastic urethane, examples of polymer materials that may be suitable for barrier 40 include polyurethane, polyester, polyester polyurethane, and polyether polyurethane. Barrier 40 may also be formed from a material that includes alternating layers of thermoplastic polyurethane and ethylene-vinyl alcohol copolymer, as disclosed in U.S. Pat. Nos. 5,713,141 and 5,952,065 to Mitchell, et al. A variation upon this material may also be utilized, wherein a center layer is formed of ethylene-vinyl alcohol copolymer, layers adjacent to the center layer are formed of thermoplastic polyurethane, and outer layers are formed of a regrind material of thermoplastic polyurethane and ethylene-vinyl alcohol copolymer. Another suitable material for barrier 40 is a flexible microlayer membrane that includes alternating layers of a gas barrier material and an elastomeric material, as disclosed in U.S. Pat. Nos. 6,082,025 and 6,127,026 to Bonk, et al. Additional suitable materials are disclosed in U.S. Pat. Nos. 4,183,156 and 4,219,945 to Rudy. Further suitable materials include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340, 6,203,868, and 6,321,465 to Bonk, et al.

Discussion of Tensile Element

Tensile element 50 has a configuration of a sheet or layer that is located within the interior void of barrier 40. Tensile element 50 is also spaced inward from sidewall portion 43 and is located between first bond inhibitor 45 and second bond inhibitor 46. Tensile element 50 extends through various first apertures 47 in first bond inhibitor 45 and is secured to first barrier portion 41 in a plurality of discrete first bond areas 55. Similarly, tensile element 50 extends through various second apertures 48 in second bond inhibitor 46 and is secured to second barrier portion 42 in a plurality of discrete second bond areas 56. As discussed in greater detail below, adhesive bonding, thermal bonding, or both may be utilized to secure tensile element 50 to barrier 40. Since apertures 47 and 48 extend across chamber 33 at an offset with respect to each other, and since tensile element 50 is secured to barrier 40 in bond areas 55 and 56 extending through apertures 47 and 48, bond areas 55 and 56 may in turn extend across tensile element 50 at an offset with respect to each other.

Tensile element 50 is unbonded or unsecured to locations on second barrier portion 42 opposite each first bond area 55, and tensile element 50 is similarly unbonded or unsecured to locations on first barrier portion 41 opposite each second bond area 56. That is, tensile element 50 is (a) secured to barrier portions 41 and 42 at various locations across chamber 33, and (b) spaced from barrier portion 42 or 41, respectively, at opposite locations across a thickness of chamber 33. In turn, bond inhibitors 45 and 46 (a) may inhibit bonding between tensile element 50 and barrier portions 41 and 42, (b) may extend across portions of chamber 33 in which tensile element 50 is spaced from barrier portions 41 and 42, and (c) may be absent from portions of chamber 33 in which tensile element 50 is secured to an interior surfaces of barrier portions 41 and 42, such as bond areas 55 and 56.

Each of first bond areas 55 and second bond areas 56 is substantially surrounded by unbonded portions 53 of tensile element 50 that are spaced from the interior surface of barrier 40. Accordingly, each of first bond areas 55 and second bond areas 56 is spaced across tensile element 50 from the other first bond areas 55 and second bond areas 56. Unbonded portions 53 may be continuous, and may comprise substantially an entirety of tensile element 50 outside of bond areas 55 and 56. Also, unbonded portions 53 extend between first barrier portion 41 and second barrier portion 42 and may restrain an outward expansion of barrier 40 due to a pressurized fluid within barrier 40.

First bond areas 55 may be distributed over a portion of the interior surface of barrier 40 formed by first barrier portion 41. That is, first bond areas 55 may be secured to and distributed over non-continuous, isolated areas of an interior surface of first barrier portion 41, which may comprise less than thirty percent of an area of first barrier portion 41. Similarly, second bond areas 56 may be distributed over an opposite portion of the interior surface of barrier 40 formed by second barrier portion 41. That is, second bond areas 56 may be secured to and distributed over non-continuous, isolated areas of an interior surface of second barrier portion 42, which may comprise less than thirty percent of an area of second barrier portion 42.

Tensile element 50 may be a material layer that is substantially planar, sheet-like, or generally two-dimensional in its original state and before the pressurization of chamber 33. A variety of materials may be utilized for tensile element 50, including various textiles, polymer sheets, leather, or synthetic leather, for example. Combinations of these materials (e.g., a polymer sheet bonded to a textile) may also be utilized for tensile element 50. Alternatively, in some configurations, tensile element 50 may be contoured in its original state and before the pressurization of chamber 33. In various configurations, tensile element 50 may include a variety of materials having properties such as tensile strength, modulus of elasticity, density, and capacity to form bonds. In turn, each of these properties may have any of a range of values, such as being relatively stiff, or relatively stretchable, for example.

With regard to textiles, tensile element 50 may include or may be formed from knitted, woven, non-woven, spacer, webbing, or mesh textile materials or components that include rayon, nylon, polyester, polyacrylic, elastane, cotton, wool, or silk, for example. Moreover, the textiles may be non-stretch, may exhibit one-directional stretch, or may exhibit multi-directional stretch. More particularly, a textile material included in tensile element 50 may exhibit a one-directional stretch or a two-directional stretch of at least thirty percent prior to tensile failure. In other words, in various configurations, a material of tensile element 50 may exhibit various degrees of elasticity. Accordingly, a variety of materials are suitable for tensile element 50.

Tensile element 50 may include a polymer material, such as any of the range of polymer materials utilized for barrier 40. Tensile element 50 may include, for example, a thermoplastic polymer material. In turn, bond areas 55 and 56 of tensile element 50 may be thermal bonded to barrier 40, as described below, such that one or more thermal bonds may be formed between first bond areas 55 and barrier 40 or between second bond areas 56 and barrier 40. Similarly, discrete first bond areas 55 and discrete second bond areas 56 may be at least partially secured to barrier 40 by thermal bonds.

Bond areas 55 and 56 extend across tensile element 50 in two directions. For example, as incorporated within footwear 10, bond areas 55 and 56 extend along tensile element 50 in a both a width or a medio-lateral direction (i.e., a direction extending between medial side 15 and lateral side 14 of footwear 10) as well as a length or a posterior-anterior direction (i.e., a direction extending between forefoot region 11 and heel region 13 of footwear 10).

First bond areas 55 and second bond areas 56 also extend across tensile element 50 in a regularly-repeating pattern. More particularly, as depicted in FIGS. 3-8C, bond areas 55 and 56 have a configuration of a regularly-repeating pattern with seven rows and five columns. Each of the plurality of first bond areas 55 and the plurality of second bond areas 56 is further depicted as having a configuration of linearly aligned groups within the regularly repeating pattern. That is, first bond areas 55 extend across tensile element 50 and are arranged in three of the seven rows of the regularly repeating pattern, and second bond areas 56 extend across tensile element 50 and are arranged in four of the seven rows of the regularly repeating pattern.

The rows of first bond areas 55 and the rows of second bond areas 56 are also interspersed among each other across tensile element 50, such that linearly aligned groups of first bond areas 55 are interspersed among linearly aligned groups of second bond areas 56. With respect to the directions discussed above, the rows of first bond areas 55 and the rows of second bond areas 56 are interspersed among each other in a posterior-anterior direction. As a result, tensile member 50 may advantageously present minimal obstruction to at least one external viewing angle.

The nearest bond area adjacent to each first bond areas 55 along a row of the regularly-repeating pattern of tensile element 50 is one or more other first bond areas 55. That is, the rows of the regularly-repeating pattern include first bond areas 55 that are nearest neighbors to each other along tensile element 50. With respect to the directions discussed above, the rows include first bond areas 55 that are nearest neighbors to each other in a medio-lateral direction. In contrast, the nearest bond area adjacent to each of first bond areas 55 along the columns of the regularly-repeating pattern of tensile element 50 is one or more second bond areas 56.

In various configurations, bond areas 55 and 56 may be arranged in at least three columns extending along the length of tensile element 50 and at least three rows across the width of tensile element 50. Furthermore, in configurations of tensile element 50 in which bond areas 55 and 56 have a configuration of a regularly repeating pattern having rows and columns, the rows and columns of the regularly repeating pattern may be at substantially right angles to each other, as depicted in FIGS. 3-8C. In other configurations, the rows and columns of the regularly repeating pattern may be at other than substantially right angles to each other.

As depicted in FIGS. 3-8C, each bond area 55 and 56 has a configuration of a substantially circular shape. Additionally, each bond area 55 and 56 has a non-elongate shape (i.e., a two-dimensional shape with an extent in a first direction that does not exceed an extent in a second direction by more than a factor of two). More generally, each bond area 55 and 56 may have a configuration of a convex shape (meaning that for any two points within a bond area 55 or 56, a straight line connecting those two points is also within that bond area 55 or 56). That is, the shapes of bond areas 55 and 56 may be substantially free of outward bulges. The substantially circular, non-elongate, convex shapes of bond areas 55 and 56 may alter one or more properties of bond areas 55 and 56, such as a compactness or a configurability of bond areas 55 and 56 across tensile element 50.

General Discussion of Manufacturing

A variety of processes may be utilized to manufacture chamber 33. In general, the manufacturing processes involve (a) securing a pair of polymer sheets, which form barrier portions 41 and 42, as well as sidewall portion 43, to tensile element 50 and (b) forming a peripheral bond 44 that joins a periphery of the polymer sheets and may extend around sidewall portion 43. Peripheral bond 44 is depicted as being adjacent to the upper surface of chamber 33, but may be positioned between the upper and lower surfaces of chamber 33, or may be adjacent to the lower surface of chamber 33. The manufacturing process may also (a) locate tensile element 50 within chamber 33, and (b) secure bond areas 55 and 56 of tensile element 50 to each of barrier portions 41 and 42. Although substantially all of the manufacturing process may be performed with a mold, as described in greater detail below, each of the various parts or steps of the process may be performed separately in forming chamber 33. That is, a variety of other methods may also be utilized to form chamber 33.

In order to facilitate bonding between barrier 40 and tensile element 50, the elements of Chamber 33 may heated to soften, melt, or otherwise begin a state change of polymer materials in one or both of barrier 40 and tensile element 50. Upon contact, portions of barrier 40 and tensile member 50 will be joined or otherwise secured, thereby forming bond areas 55 and 56 through thermal bonding. Upon cooling, therefore, the tensile member 50 will be permanently joined with barrier 40.

As utilized herein, the term "thermal bonding" or variants thereof is defined as a securing technique between two elements (e.g., barrier 40 and tensile member 50) that involves a softening or melting of a thermoplastic polymer material within at least one of the elements such that the materials of the elements are secured to each other when cooled. Similarly, the term "thermal bond" is defined as the bond, link, or structure that joins two elements through a process that involves a softening or melting of a thermoplastic polymer material within at least one of the elements such that the materials of the elements are secured to each other when cooled. Thermal bonding may involve, for example, the melting or softening of thermoplastic materials within each of two or more elements to join the elements. Accordingly, thermal bonding may create a polymer bond (i.e., a thermal bond between a polymer material of one element and a polymer material of another element).

Thermal bonding does not generally involve the use of adhesives, but involves directly bonding elements to each other with heat. In some situations, however, adhesives may be utilized to supplement the thermal bond or the joining of elements through thermal bonding. For example, as an alternative to thermal bonding, or in addition to thermal bonding, an adhesive, a thermally-activated adhesive, or other securing structure may be utilized in joining the elements.

Following the manufacturing process, or as part of the manufacturing process, a fluid may be injected into the interior void and pressurized between zero and three-hundred-fifty kilopascals (i.e., approximately fifty-one pounds per square inch) or more. The pressurized fluid exerts an outward force upon barrier 40, which tends to separate barrier portions 41 and 42. Tensile element 50, however, is secured to each of barrier portions 41 and 42 and operates to retain the intended shape of chamber 33 when pressurized. More particularly, unbonded portions 53 of tensile element 50 extending across the interior void are placed in tension by the outward force of the pressurized fluid upon barrier 40, thereby preventing barrier 40 from expanding outward and causing chamber 33 to retain an intended shape. Whereas peripheral bond 44 joins the polymer sheets to form a seal that prevents the fluid from escaping, tensile element 50 prevents barrier 40 from expanding outward or otherwise distending due to the pressure of the fluid. That is, tensile element 50 effectively limits the expansion of chamber 33 to retain an intended shape of barrier portions 41 and 42.

Discussion of Bond Inhibitors

Although various techniques may be utilized in the general manufacturing process discussed above, bond inhibitors 45 and 46 prevent barrier 40 and tensile element 50 from being bonded to each other, except in the locations of bond areas 55 and 56. That is, bond inhibitors 45 and 46 permit bonding in bond areas 55 and 56, while ensuring that unbonded portions 53 of tensile element 50 remain separate from and unjoined to barrier 40.

First bond inhibitor 45 is located adjacent to an inner surface of first barrier portion 41, and second bond inhibitor 46 is located adjacent to an inner surface of second barrier portion 42. As depicted, bond inhibitors 45 and 46 have a configuration of sheets through which the pluralities of first apertures 47 and second apertures 48 extend, respectively. Within chamber 33, first apertures 47 may extend across chamber 33 at an offset with respect to second apertures 48, such that apertures 47 and 48 may not be aligned with each other. For example, first apertures 47 may be unaligned with second apertures 48 in a vertical direction.

Bond inhibitors 45 and 46 may be formed of bond-inhibiting materials, i.e., materials that are less prone to thermal bonding or other types of bonding than various materials of barrier 40 and tensile element 50. There may be ranges of pressures and temperatures that facilitate thermal bonding between tensile element 50 and barrier 40, but will not facilitate thermal bonding between barrier 40 and bond inhibitors 45 and 46, or between bond inhibitors 45 and 46 and tensile element 50, or both.

Although depicted as having a configuration of discrete sheets of material, bond inhibitors 45 and 46 may be integrated with one or more of tensile element 50, first barrier portion 41, and second barrier portion 42. For example, one or more of barrier 40 and tensile element 50 may include a material, concentrated at locations along a surface, which may be less prone to thermal bonding than other materials of barrier 40 or tensile element 50. Accordingly, during the heating and compression of a manufacturing process, bond areas 55 or 56 may preferentially form at locations on tensile element 50 not corresponding with the integrated bond inhibitors.

Although chamber 33 is depicted as including two bond inhibitors 45 and 46, in some configurations, chamber 33 may include other numbers of bond inhibitors. For example, in some configurations, chamber 33 may include only one bond inhibitor adjacent to an inner surface of first barrier portion 41 or second barrier portion 42. Alternatively, other configurations of chamber 33 may include multiple discrete or otherwise separate bond inhibitors adjacent to the same barrier portion, such as multiple bond inhibitors that substantially correspond in extent to a single one of first bond inhibitor 45 or second bond inhibitor 46. Some configurations of chamber 33 may not include any bond inhibitors.

Discussion of Advantages

Chamber 40 has various advantages over some other types of fluid-filled chambers. For example, chamber 40 may be formed in a relatively efficient manner from layers of material.

Manufacturing Process

Figure 9:
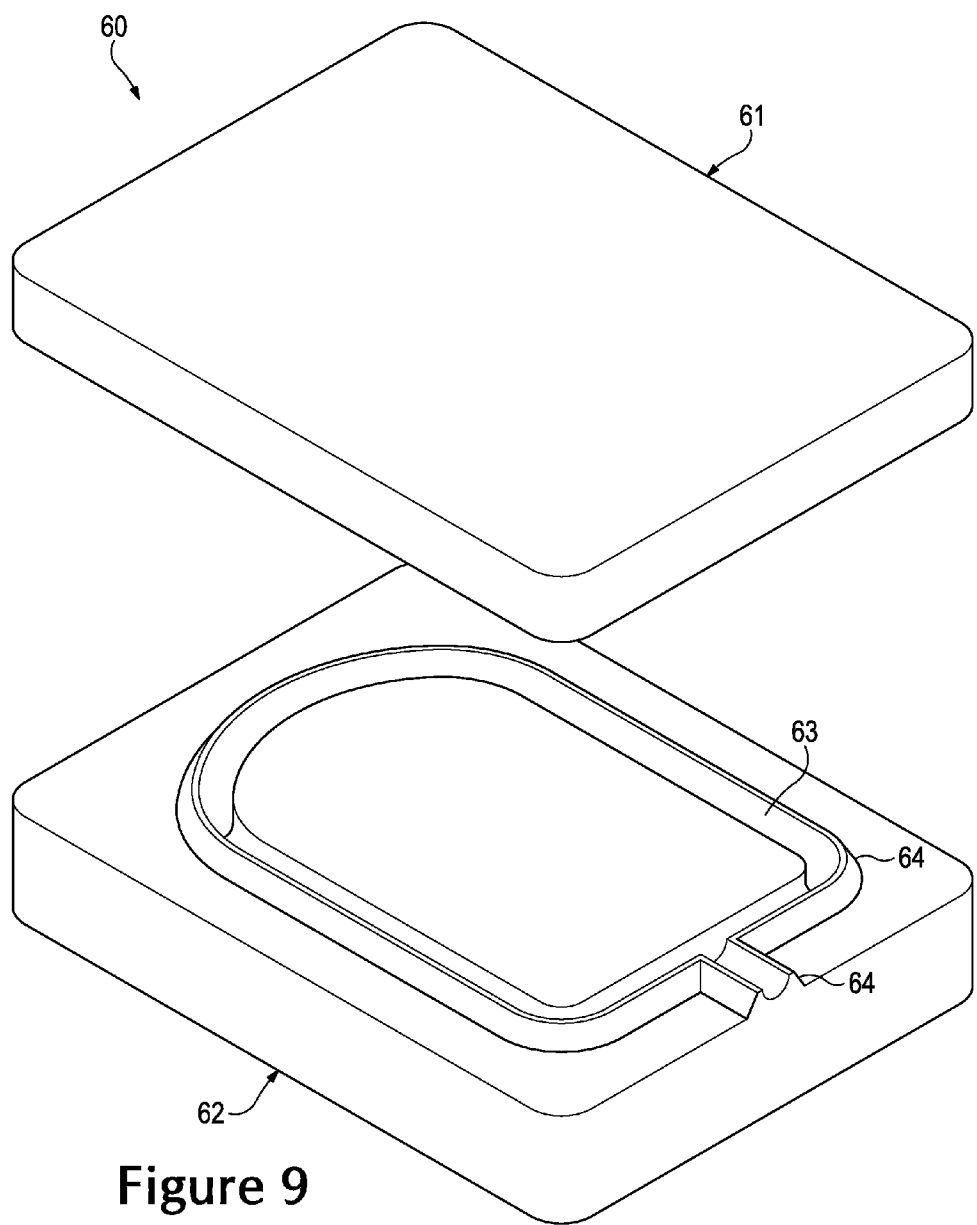
FIG. 9 is a perspective view of a mold that may be utilized in a process for manufacturing the chamber.

Although a variety of manufacturing processes may be utilized to form chamber 33, an example of a suitable thermoforming process will now be discussed. With reference to FIG. 9, a mold 60 that may be utilized in the thermoforming process is depicted as including a first mold portion 61 and a second mold portion 62. Mold 60 is utilized to form chamber 33 from a pair of polymer sheets that are molded and bonded to define first barrier portion 41, second barrier portion 42, and sidewall portion 43. The thermoforming process also secures tensile element 50 within barrier 40. More particularly, mold 60 (a) imparts shape to one of the polymer sheets in order to form first barrier portion 41, (b) imparts shape to the other of the polymer sheets in order to form second barrier portion 42, (c) imparts shape to the polymer sheets in order to form sidewall portion 43 and to form peripheral bond 44 to join a periphery of the polymer sheets, and (d) bonds tensile element 50 to each of barrier portions 41 and 42.

Figure 10A:
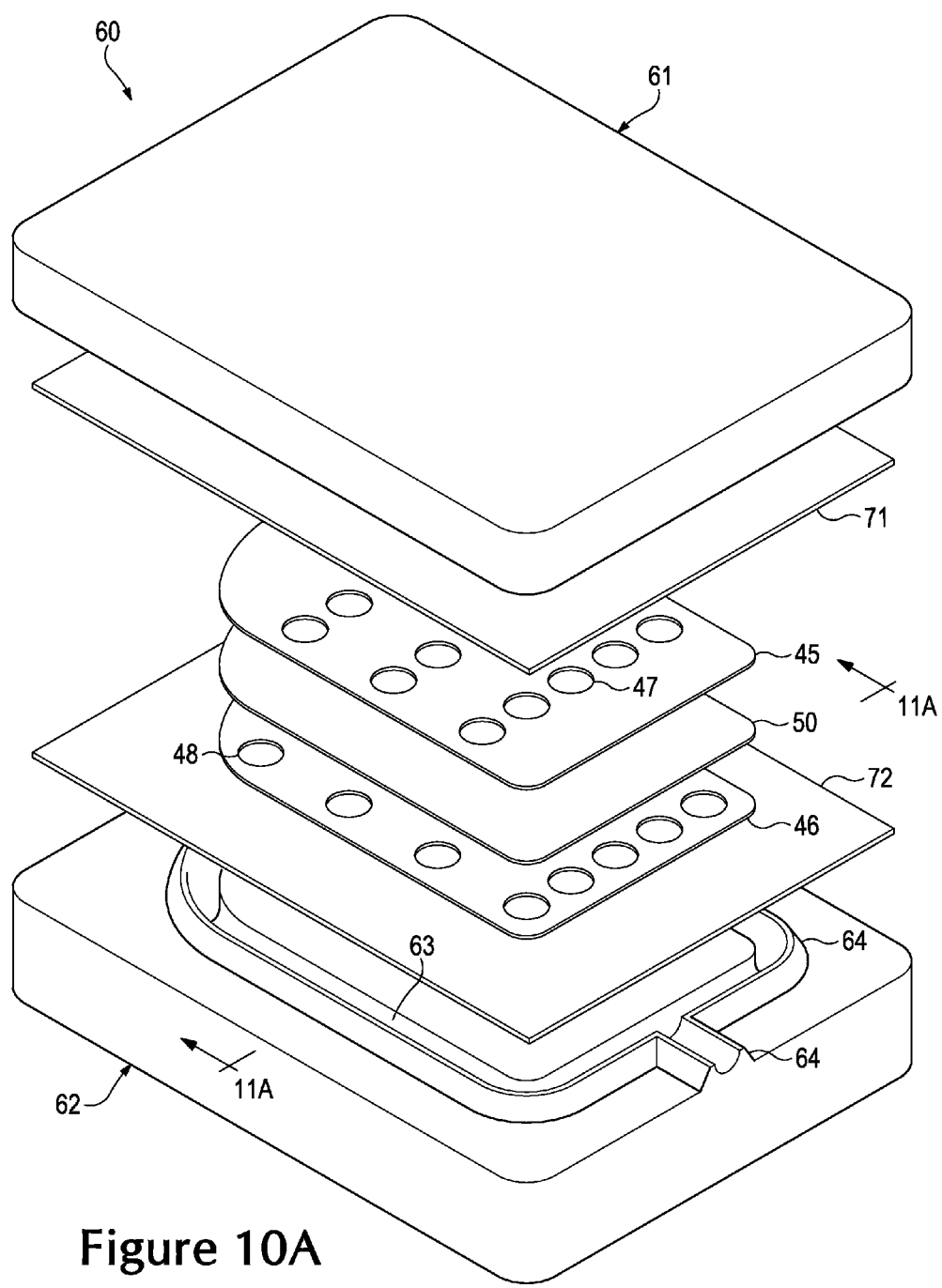
FIGS. 10A-10D are perspective views of the mold depicting steps in the process for manufacturing the chamber.
Figure 11A:
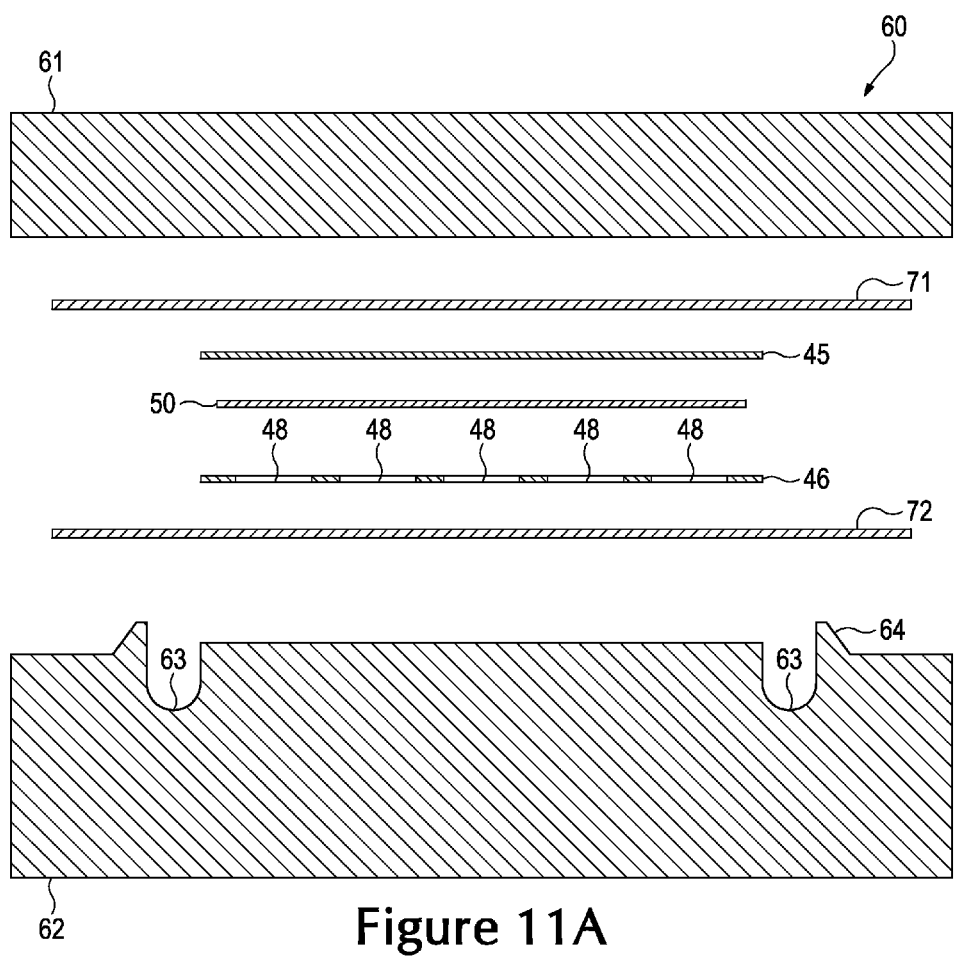
FIGS. 11A-11D are schematic cross-sectional views of the mold, as respectively defined by section lines 11A-11D in FIGS. 10A-10D.

In manufacturing chamber 33, the various components of chamber 33 are located between mold portions 61 and 62, as depicted in FIGS. 10A and 11A. In order to properly position the components, a shuttle frame or other device may be utilized. Subsequently, the various components of chamber 33 are heated to a temperature that facilitates bonding between the components. Depending upon the specific materials utilized for tensile element 50 and polymer layers 71 and 72, which form barrier 40, suitable temperatures may range from 120 to 200 degrees Celsius (248 to 392 degrees Fahrenheit) or more. Various radiant heaters or other devices may be utilized to heat the various components of chamber 33. In some manufacturing processes, mold 60 may be heated such that contact between mold 60 and the various components of chamber 33 raises the temperature of the components to a level that facilitates bonding. In alternate manufacturing processes, the various components of chamber 33, such as one or more of polymer layers 71 and 72, bond inhibitors 45 and 46, and tensile element 50, may be heated before being located between mold portions 61 and 62.

Once the various components of chamber 33 are positioned and heated, mold portions 61 and 62 translate toward each other and begin to close upon the components such that (a) first mold portion 61 contacts first polymer layer 71, and (b) ridge 64 of second mold portion 62 contacts second polymer layer 72. In turn, portions of first polymer layer 71 may be brought closer to and may be exposed to portions of tensile element 50 through first apertures 47 in first bond inhibitor 45. Similarly, portions of second polymer layer 72 may be brought closer to and may be exposed to portions of tensile element 50 through second apertures 48 in second bond inhibitor 46. The components are thus located relative to mold 60 and initial shaping and positioning has occurred.

Air may then be partially evacuated from the area around polymer layers 71 and 72 through various vacuum ports in mold portions 61 and 62. The purpose of evacuating the air is to draw polymer layers 71 and 72 into contact with the various contours of mold 60. This ensures that polymer layers 71 and 72 are properly shaped in accordance with the contours of mold 60. Note that polymer layers 71 and 72 may stretch in order to extend around tensile element 50 and into mold 60. The thickness of polymer layers 71 and 72 before being compressed between mold portions 61 and 62 may be greater than the thickness of the corresponding portions of barrier 40 after the manufacture of chamber 33 has been completed. This difference between the original thicknesses of polymer layers 71 and 72 and the resulting thickness of barrier 40 may occur as a result of the stretching taking place at this stage of the thermoforming process.

Mold portions 61 and 62 may place a specific degree of pressure upon the components, thereby bonding and securing polymer layers 71 and 72 to opposite surfaces of tensile element 50. More specifically, portions of first polymer layer 71 may be thermal bonded to portions of tensile element 50 through first apertures 47 in first bond inhibitor 45 in discrete and spaced areas corresponding with first bond areas 55. Similarly, portions of second polymer layer 72 may be thermal bonded to portions of tensile element 50 through second apertures 48 in second bond inhibitor 46 in discrete and spaced areas corresponding with second bond areas 56. Second mold portion 62 includes peripheral cavity 63 that forms sidewall portion 43 from second polymer layer 72 at a location spaced from a periphery of tensile element 50. As depicted in FIGS. 9-11D, polymer layers 71 and 72 are thermal bonded to tensile element 50, but in other manufacturing processes, polymer layers 71 and 72 may be otherwise secured to tensile element 50. For example, polymer layers 71 and 72 may be secured to tensile element 50 by an adhesive, or by use of thermoplastic threads or strips, as disclosed in U.S. Pat. No. 7,070,845 to Thomas, et al.

Figure 10B:
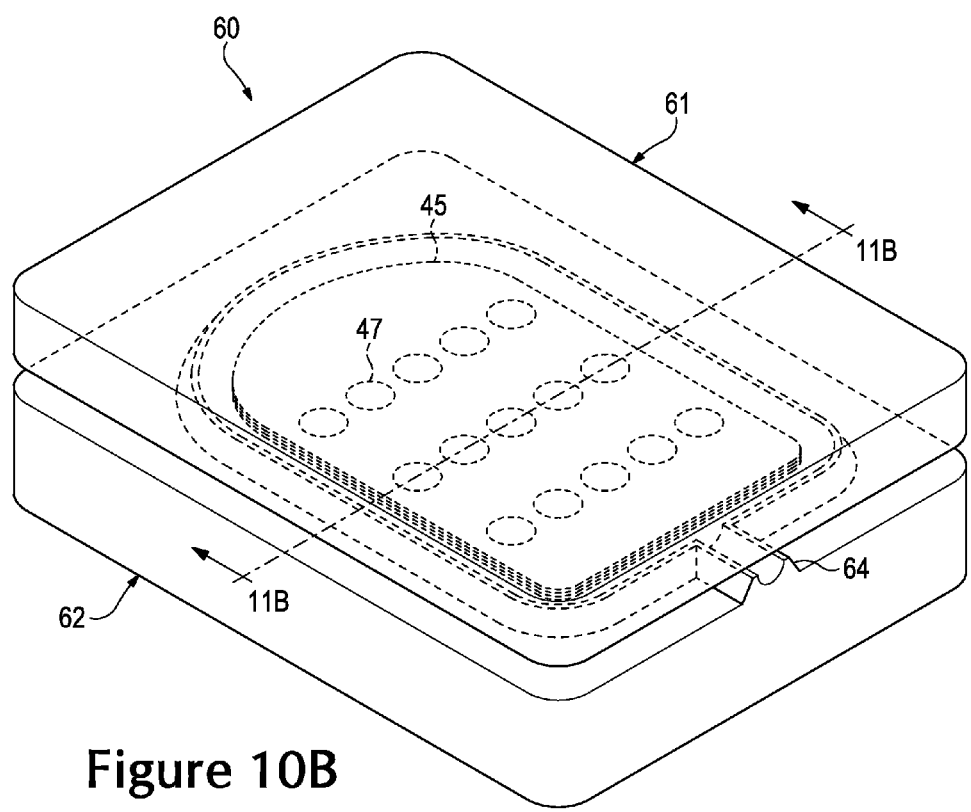
Figure 11B:
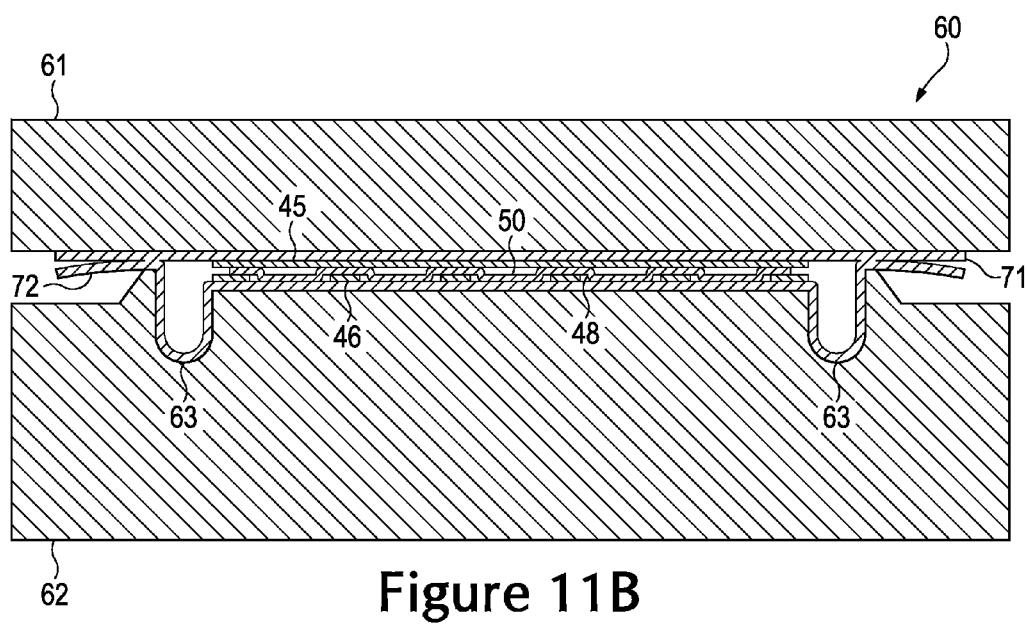

As mold 60 closes further, first mold portion 61 and ridge 64 bond first polymer layer 71 to second polymer layer 72, as depicted in FIGS. 10B and 11B, thereby forming peripheral bond 44 and an interior void between first polymer layer 71 and second polymer layer 72. A periphery of tensile element 50 is spaced inward from peripheral cavity 64 and ridge 64. Furthermore, portions of ridge 64 that extend away from tensile element 50 form a bond between other areas of polymer layers 71 and 72, contributing to the formation of inflation conduit 73.

In order to provide a second means for drawing polymer layers 71 and 72 into contact with the various contours of mold 60, the area between polymer layers 71 and 72 and proximal to tensile element 50 may be pressurized. During a preparatory stage of this method, an injection needle may be located between polymer layers 71 and 72, and the injection needle may be located such that ridge 64 envelops the injection needle when mold 60 closes. A gas may then be ejected from the injection needle such that polymer layers 71 and 72 engage ridge 64. Inflation conduit 73 may thereby be formed (see FIG. 10C) between polymer layers 71 and 72. The gas may then pass through inflation conduit 73, thereby entering and pressurizing the area proximal to tensile element 50 and between polymer layers 71 and 72. In combination with the vacuum, the internal pressure ensures that polymer layers 71 and 72 contact the various surfaces of mold 60.

In order to facilitate bonding between tensile element 50 and barrier 40, a supplemental polymer material may be added to or incorporated within tensile element 50. When heated, the supplemental polymer material may soften, melt, or otherwise begin to change state so that contact with barrier portions 41 and 42 induces material from barrier 40 to intermingle or otherwise join with the supplemental polymer material. Upon cooling, therefore, the supplemental polymer material may be permanently joined with barrier 40, thereby joining tensile element 50 with barrier 40. In some configurations, thermoplastic threads or strips may be present within tensile element 50 to facilitate bonding with barrier 40, as disclosed, for example, in U.S. Pat. No. 7,070,845 to Thomas, et al., or an adhesive may be utilized to secure barrier 40 and tensile element 50. The pressure exerted upon the components by mold portions 61 and 62 ensures that the supplemental layer or thermoplastic threads form a bond with polymer layers 71 and 72.

Figure 10C:
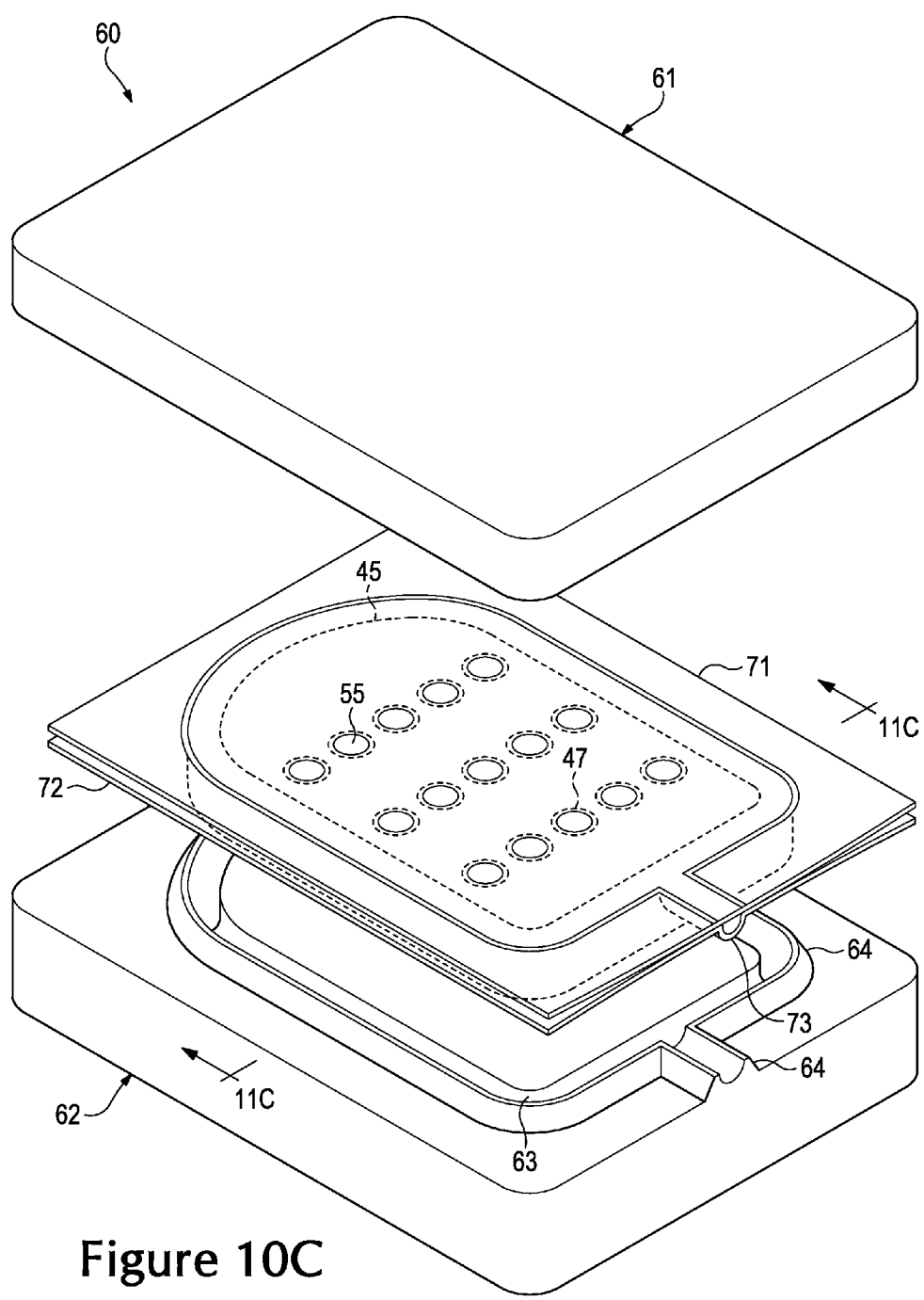
Figure 11C:
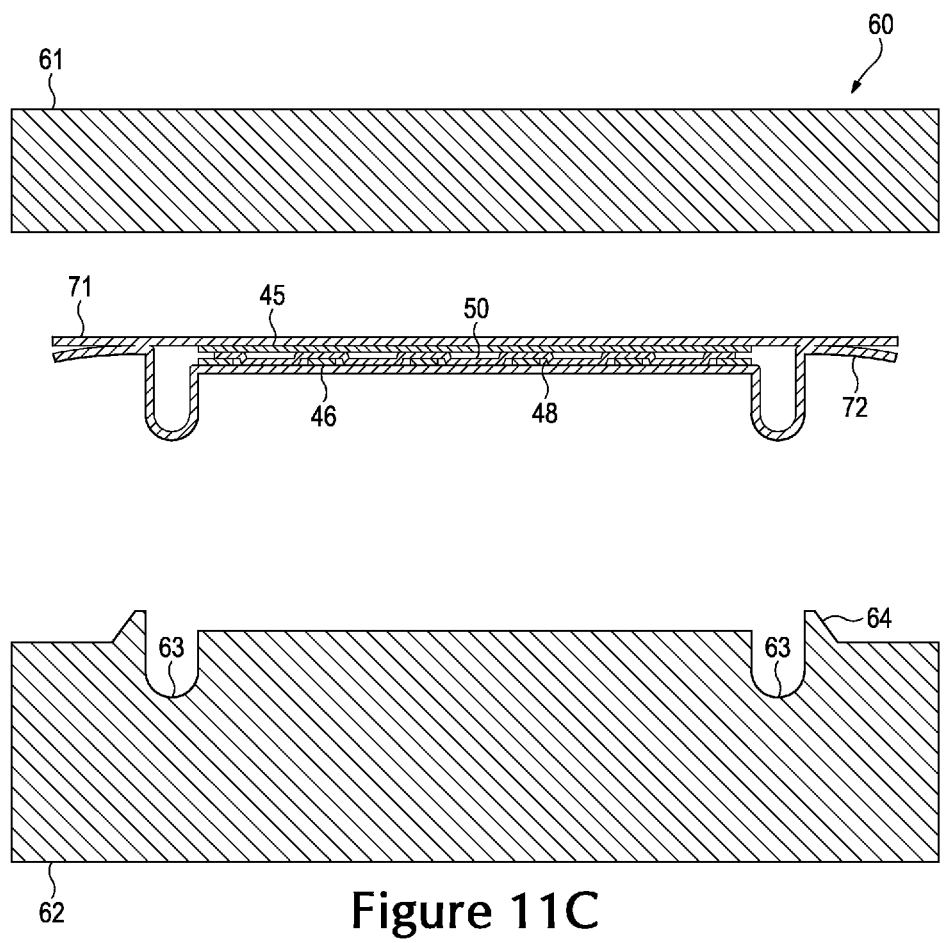

When bonding is complete, mold 60 is opened and the various components of chamber 33 and excess portions of polymer layers 71 and 72 are permitted to cool, as depicted in FIGS. 10C and 11C. A fluid may be injected into the interior void through the inflation needle and inflation conduit 73. Upon exiting mold 60, tensile element 50 remains in the compressed configuration. When chamber 33 is pressurized, however, the fluid places an outward force upon barrier 40, which tends to separate barrier portions 41 and 42, thereby placing tensile element 50 in tension. More specifically, tensile element 50 may be secured to and in contact with first polymer layer 71 in first bond areas 55, while tensile element 50 may be secured to and in contact with second polymer layer 72 in second bond areas 56. Upon pressurization, unbonded portions 53 of tensile element 50 may extend across the interior void and may be spaced from polymer layers 71 and 72.

Figure 10D:
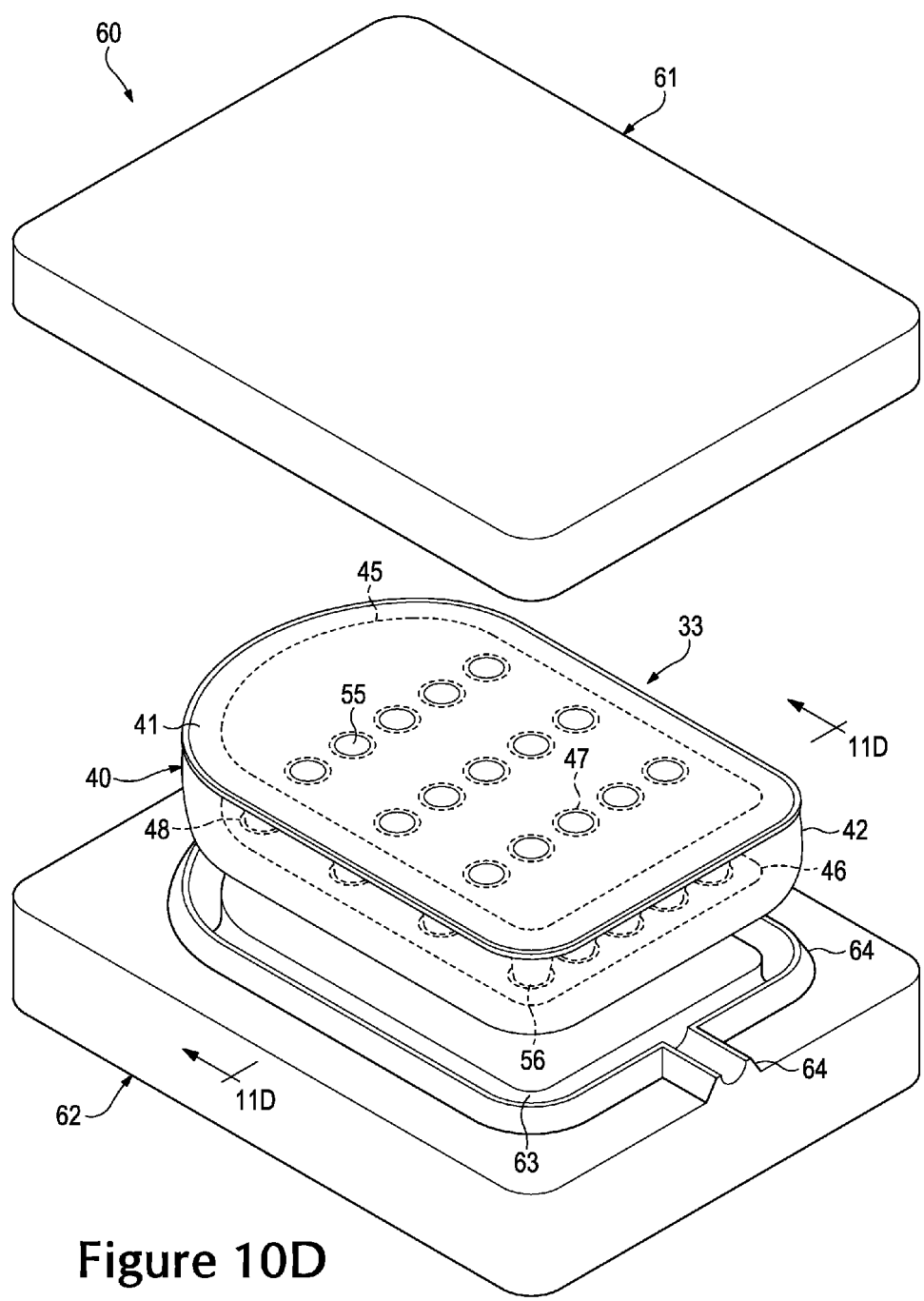
Figure 11D:
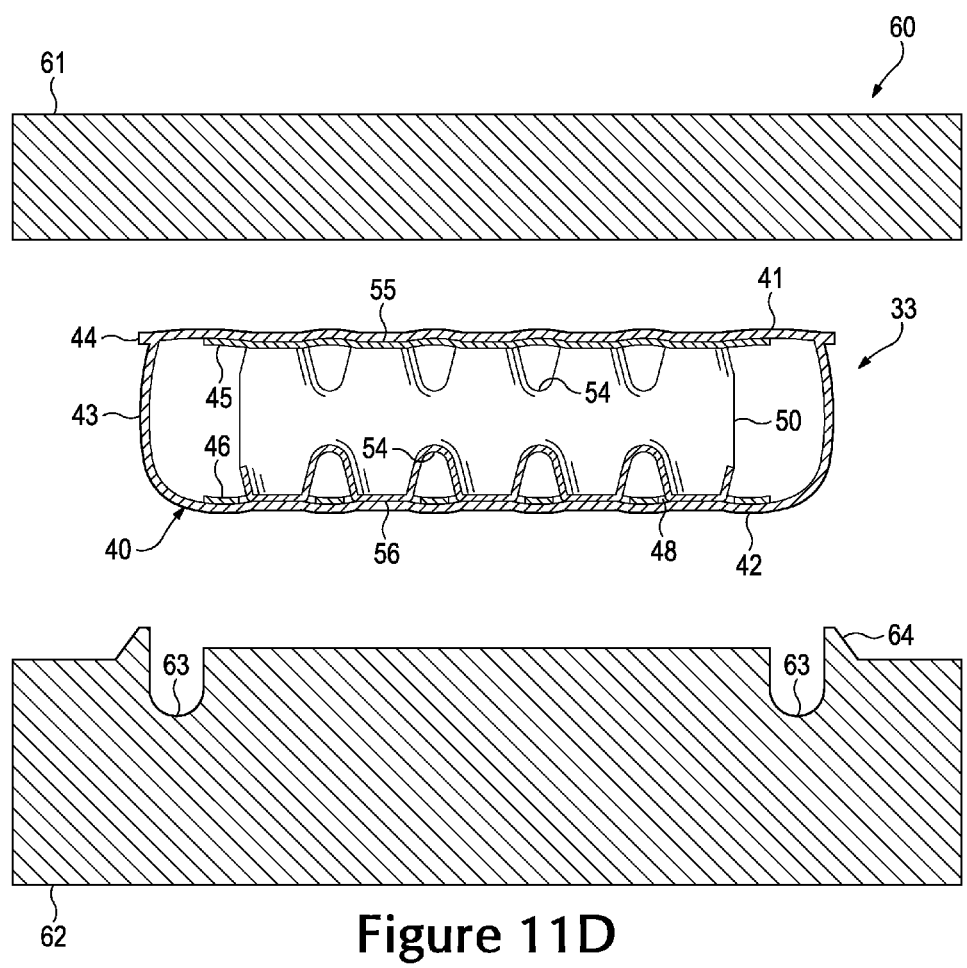

In addition, a sealing process is utilized to seal inflation conduit 73 adjacent to chamber 33 after pressurization. The excess portions of polymer layers 71 and 72 are then removed, thereby completing the manufacture of chamber 33, as depicted in FIGS. 10D and 11D. As an alternative, the order of inflation and removal of excess material may be reversed. As a final step in the process, chamber 33 may be tested and then incorporated into midsole 31 of footwear 10.

Further Configurations

Figure 12A:
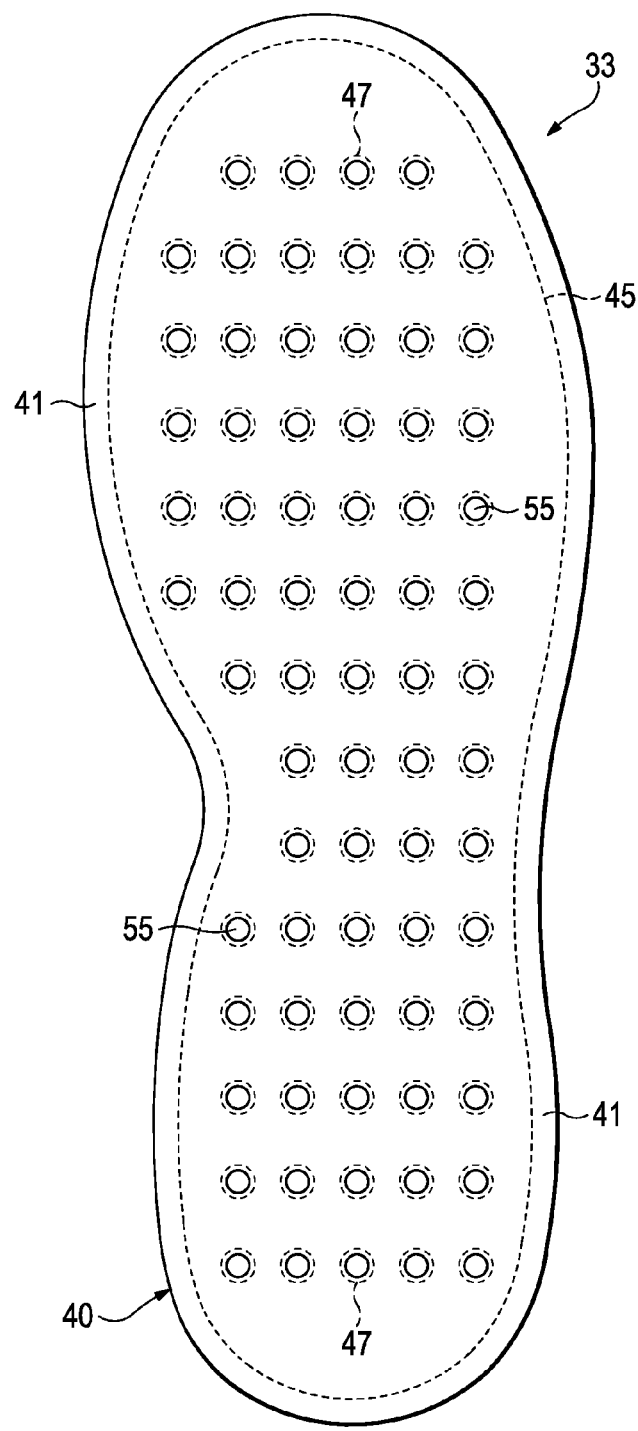
FIGS. 12A-12G are top plan views corresponding with FIG. 5 and depicting further configurations of the chamber.

As depicted in FIGS. 3-8C, chamber 33 is configured to extend primarily through heel region 13 of footwear 10. In other configurations, chamber 33 may have an alternate extent. For example, as depicted in FIG. 12A, chamber 33 may be configured to extend through substantially all of footwear 10 (i.e., from forefoot region 11 to heel region 13, and also from lateral side 14 to medial side 15). Although not depicted, chamber 33 may also have a shape that is incorporated into only forefoot region 11 and extends under forward areas of the foot.

Figure 12C:
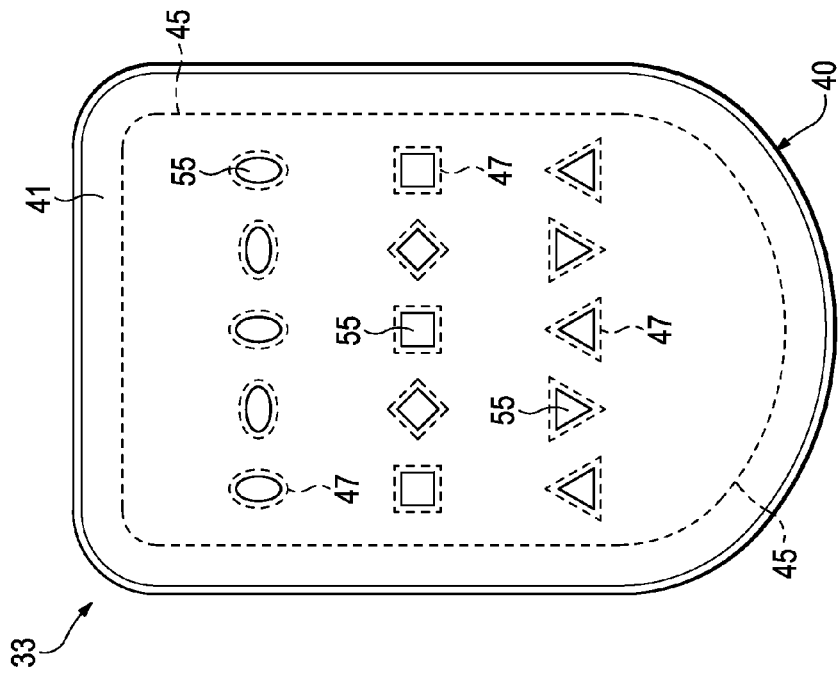
Figure 12B:
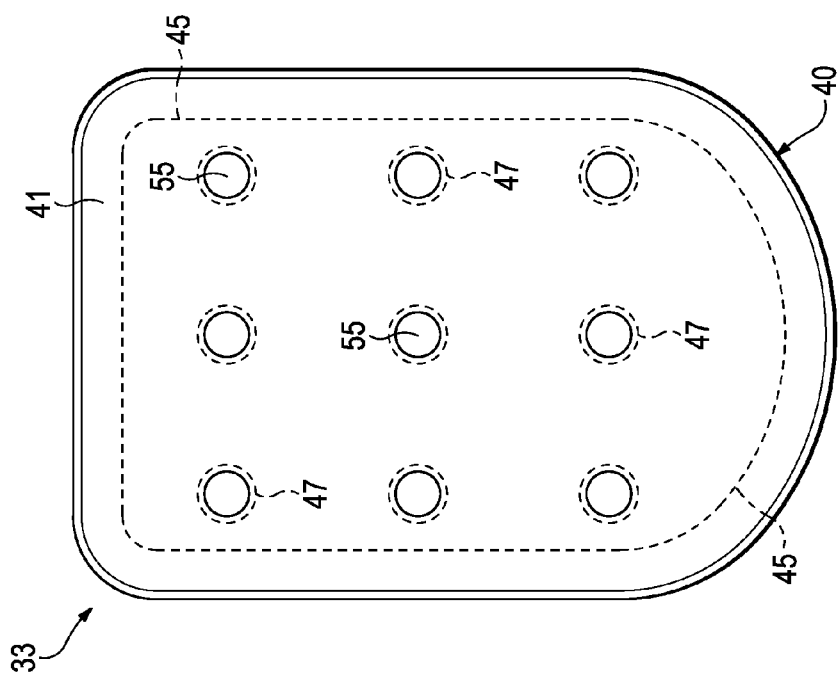

Although depicted in FIGS. 3-8C as extending across tensile element 50 in a regularly repeating pattern having seven rows and five columns, with first bond areas 55 being arranged in three of the seven rows and second bond areas 56 being arranged in four of the seven rows, bond areas 55 and 56 may be otherwise configured. In various other configurations, bond areas 55 and 56 may extend across tensile element 50 with an alternate spacing or in alternate numbers of rows and columns. For example, as depicted in FIG. 12B, first bond areas 55 are arranged in three rows and three columns of a regularly repeating pattern extending across tensile element 50. Second bond areas 56 may in turn be arranged in two rows and three columns, such that the regularly repeating pattern extends across tensile element 50 in a total of five rows and three columns.

Figure 12E:
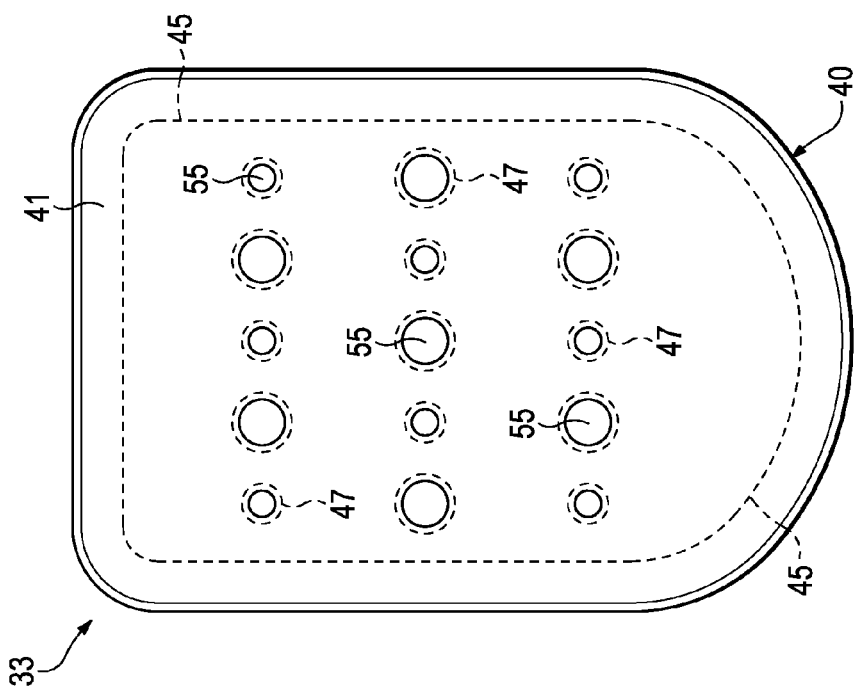
Figure 12D:
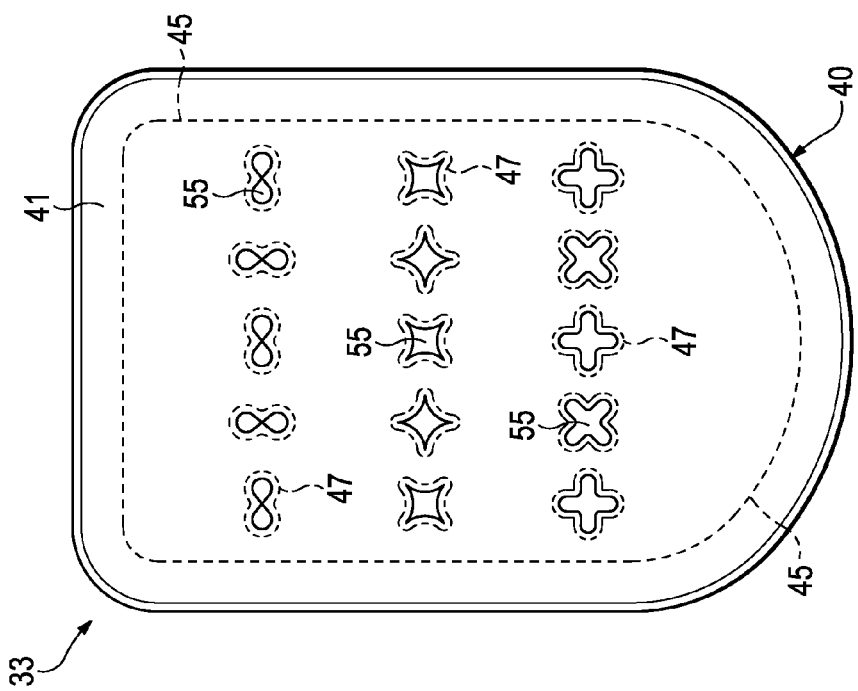

Each of bond areas 55 and 56 is depicted in FIGS. 3-8C as having a convex, substantially circular, non-elongate shape. In other configurations, any of bond areas 55 or 56 may have an alternate shape. For example, as depicted in FIG. 12C, first bond areas 55 might have convex shapes of ellipsoids or other non-elongate spheroids, squares, or triangles. First bond areas 55 might also have convex shapes of non-elongate rectangles, hexagons, diamonds, trapezoids, other polygons, or any other regular geometric shape or irregular shape. As another example, as depicted in FIG. 12D, first bond areas 55 might have non-convex shapes such as figure-eights, laterally-compressed or pinched squares, or crosses. First bond areas 55 might also have non-convex shapes including polygons or any other regular geometric shape or irregular shape. Additionally, as depicted in FIGS. 12C and 12D, the shapes of first bond areas 55 may be oriented at any angle with respect to a medio-lateral direction, or with respect to a posterior-anterior direction.

Either as an alternative to or in addition to bond inhibitors 45 and 46, bond facilitators may be incorporated into one or more of tensile element 50, first barrier portion 41, or second barrier portion 42. Such bond facilitators may be formed of bond-facilitating materials, i.e., materials that are more prone to thermal bonding than various other materials of barrier 40 and tensile element 50. Accordingly, during the heating and compression of a manufacturing process, bond areas 55 or 56 may preferentially form at locations on the surfaces of tensile element 50 corresponding with the integrated bond facilitators.

As depicted in FIGS. 3-8C, each of bond areas 55 and 56 have substantially similar sizes. In other configurations, bond areas 55 and 56 may have different or varying sizes. For example, as depicted in FIG. 12E, some first bond areas 55 are larger than other first bond areas 55. Furthermore, bond areas 55 and 56 may vary in size across tensile element 50 in a regularly repeating pattern or in any other manner, including an irregular manner.

Figure 12G:
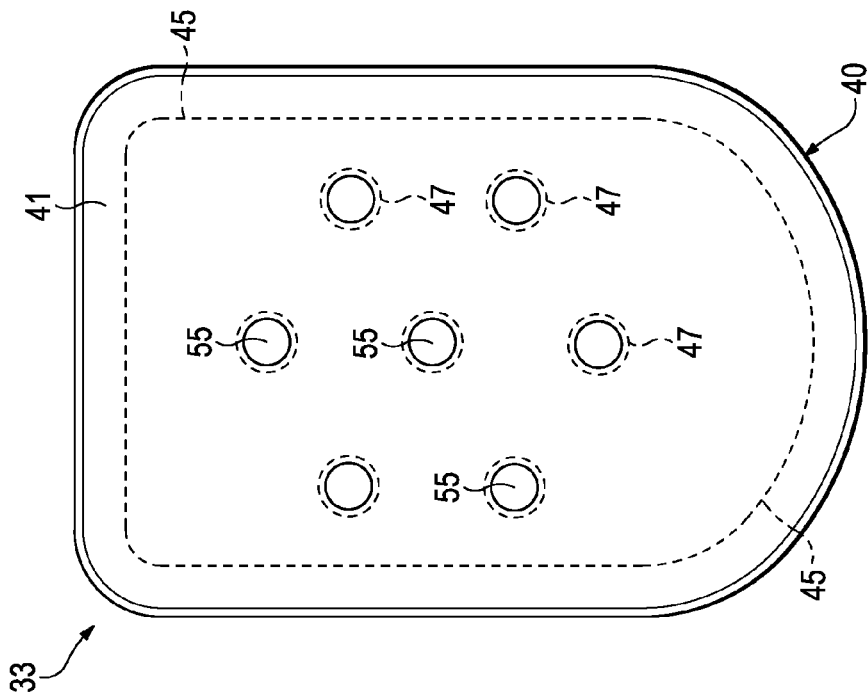
Figure 12F:
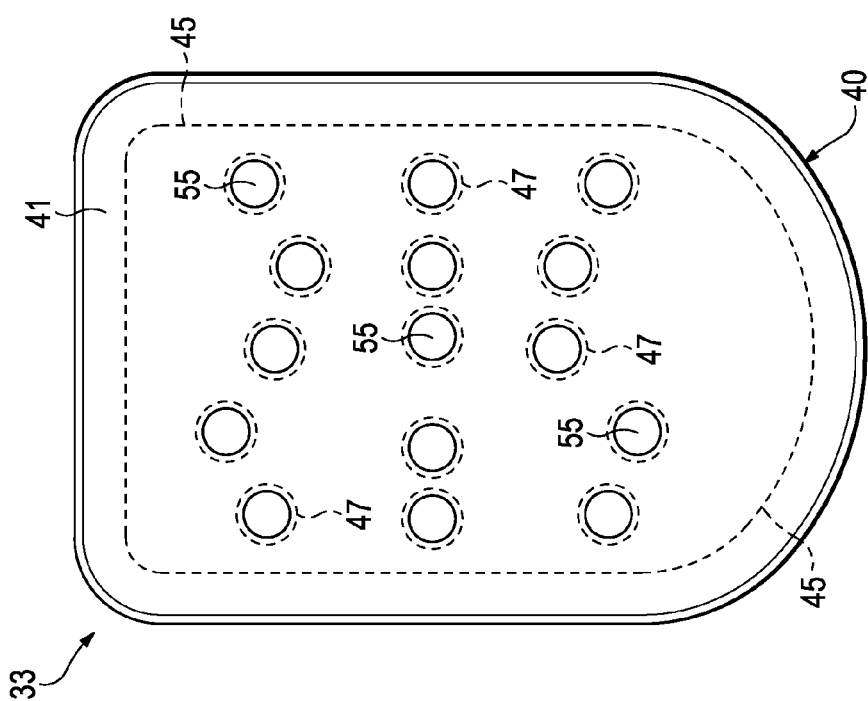

Bond areas 55 and 56 are depicted in FIGS. 3-8C as having a configuration of a regularly repeating pattern. In other configurations, bond areas 55 and 56 may be otherwise distributed across tensile element 50. For example, as depicted in FIG. 12F, first bond areas 55 may be distributed across tensile element 50 in an unpatterned or otherwise irregular manner.

Figure 13:
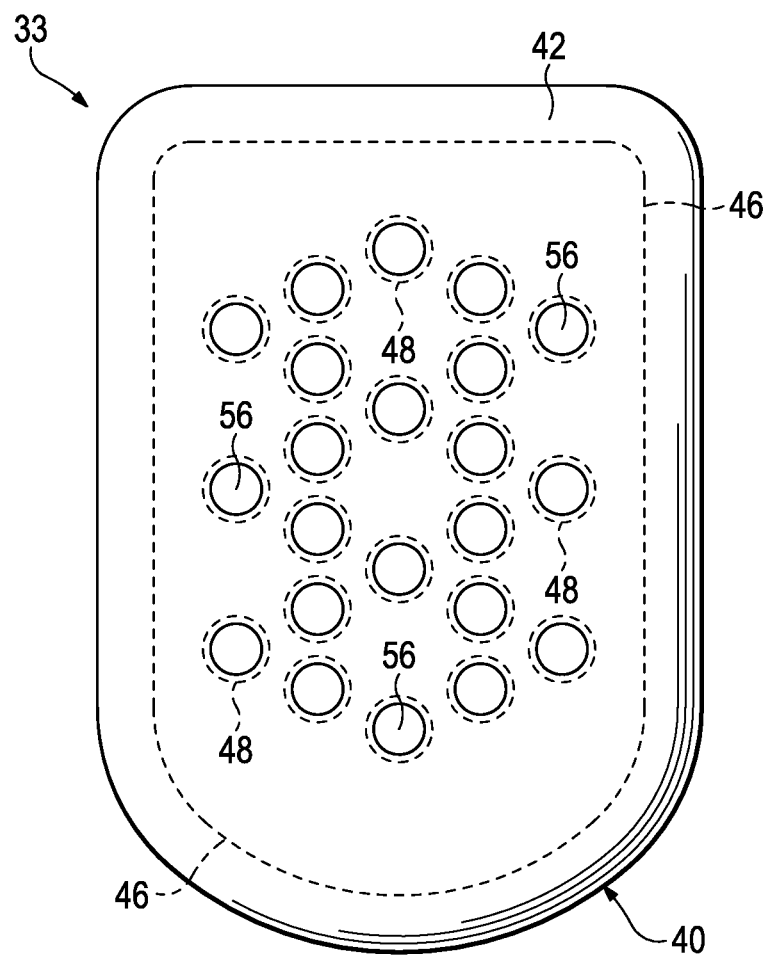
FIG. 13 is a bottom plan view corresponding with FIG. 6 and depicting a further configuration of the chamber.

In FIGS. 3-8C, bond areas 55 and 56 are also depicted as having a configuration of a regularly repeating pattern in which the pattern has columns and rows at substantially right angles to each other. Put another way, the pattern depicted in FIGS. 3-8C corresponds with a substantially square grid. In other configurations, bond areas 55 and 56 may be otherwise patterned. For example, as depicted in FIG. 12G, the pattern of first bond areas 55 corresponds with a substantially hexagonal grid, whereas the pattern depicted in FIG. 13 of second bond areas 56 corresponds with a substantially diamond-shaped grid. In turn, first bond areas 55 of FIG. 12G and second bond areas 56 of FIG. 13 may both be distributed across tensile element 50, with first bond areas 55 being spaced apart from second bond areas 56 across tensile element 50.

Additionally, the relative relationship between the height of chamber 33 and the width or the length of chamber 33 may differ from the relative relationship depicted in FIGS. 3-8C. For example, as depicted in FIG. 14A, the height of chamber 33 relative to its width is greater than the height of chamber 33 relative to its width as depicted in FIGS. 3-8C. Accordingly, in various configurations, the ratio of the height of chamber 33 to either its width or its length may be either greater or less than as depicted in FIGS. 3-8C.

As depicted in FIGS. 3-8C, first bond inhibitor 45 is proximal to first barrier portion 41, and second bond inhibitor 46 is proximal to second barrier portion 42. However, other configurations of chamber 33 may include fewer bond inhibitors. For example, in some configurations of chamber 33, a bond inhibitor may be proximal to only one of barrier portions 41 and 42. In other configurations, such as the configuration depicted in FIG. 14B, chamber 33 may include no bond inhibitors at all.

Figure 15:
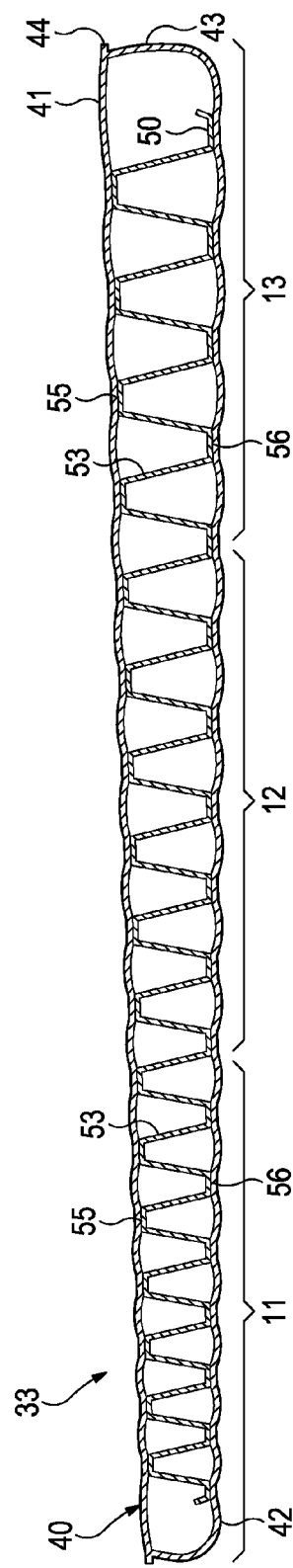
FIG. 15 is a cross-sectional view corresponding with FIG. 8C and depicting a further configuration of the chamber.
Figure 16:
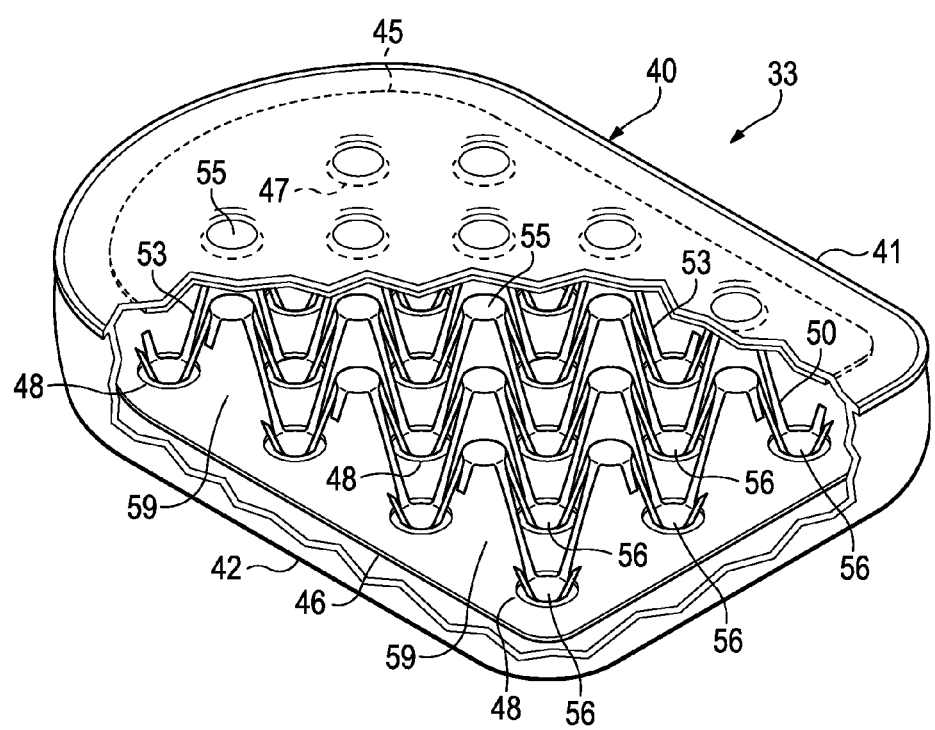
FIG. 16 is a partial cross-sectional perspective view of a further configuration of the chamber.

The spacing between bond areas 55 and 56 as depicted in FIGS. 3-8C is substantially regular across tensile element This substantially regular spacing may impart a substantially parallel configuration to barrier portions 41 and 42. However, in other configurations, the spacing between bond areas 55 and 56 may impart a contour to chamber 33. For example, as depicted in FIG. 15, the spacing between bond areas 55 and 56 across tensile element 50 is greater in heel region 13 than in forefoot region 11. Correspondingly, the distance between barrier portions 41 and 42 in heel region 13 is greater than the distance between barrier portions 41 and 42 in forefoot region 11, imparting a taper to chamber 33. Alternatively, the spacing between bond areas 55 and 56 may form an indentation, or depression, or protrusion in chamber 33. Differences in the spacing between bond areas 55 and 56 may impart contours similar to those disclosed in U.S. patent application Ser. No. 12/123,612 to Dua and Ser. No. 12/123,646 to Rapaport, et al. Bond areas 55 and 56 are depicted in FIGS. 3-8C as extending across tensile element 50 in a regularly repeating pattern having seven rows and five columns, of which first bond areas 55 are arranged in three of the seven rows and second bond areas 56 are arranged in four of the seven rows. However, in other configurations, bond areas 55 and 56 may otherwise extend across tensile element 50. For example, as depicted in FIGS. 16-19B, both first bond areas 55 and second bond areas 56 are arranged in all seven rows and all five columns of a regularly repeating pattern across tensile element 50. More particularly, first bond areas 55 alternate in a checkerboard-like manner with second bond areas 56 across tensile element 50. As a result, first bond areas 55 are interspersed with second bond areas 56 in both a first direction (i.e., a medio-lateral direction) and a second direction (i.e., a posterior-anterior direction).

Accordingly, when considered separately, first bond areas 55 may have a configuration of a first regularly repeating pattern, and second bond areas 56 may have a configuration of a second regularly repeating pattern, and the second regularly repeating pattern may extend across tensile element 50 at an offset with respect to the first regularly repeating pattern. So configured, at least two rows of first bond areas 55 may be interspersed with at least two rows of second bond areas 56 across tensile element 50, and at least two columns of first bond areas 55 may be interspersed with at least two columns of second bond areas 56 across tensile element 50.

In the alternate configuration depicted in FIGS. 16-19B, first bond areas 55 may be interspersed with second bond areas 56 in at least two directions. For example, first bond areas 55 may be interspersed with second bond areas 56 in both a medio-lateral direction and a posterior-anterior direction.

Additionally, as depicted in FIGS. 16-19B, a plurality of apertures 59 in tensile element 50 extend between bond areas 55 and 56 in portions of tensile element 50 spaced from the interior surface of barrier 40, or portions of tensile element 50 not in contact with barrier 40. In some such configurations, due to the extent of apertures 59, unbonded portions 53 may comprise a plurality of discrete portions of tensile element 50, each connecting a first bond area 55 to a second bond area 56. In other words, tensile element 50 may have a plurality of unbonded portions 53, each unbonded portion 53 being connected at one end to first barrier portion 41 at a discrete first bond area 55, and being connected at an opposite end to second barrier portion 42 at a discrete second bond area 56. Accordingly, tensile member 50 may advantageously present minimal obstruction to at least two external viewing angles.

The invention is disclosed above and in the accompanying figures with reference to a variety of configurations. The purpose served by the disclosure, however, is to provide an example of the various features and concepts related to the invention, not to limit the scope of the invention. One skilled in the relevant art will recognize that numerous variations and modifications may be made to the configurations described above without departing from the scope of the present invention, as defined by the appended claims.

What is claimed is:

1. A method of manufacturing an article of footwear, the method comprising:
   locating a first polymer layer, a second polymer layer, and a tensile layer between two mold portions, the tensile layer being positioned between the first polymer layer and the second polymer layer;
   locating a bond inhibiting sheet between the tensile layer and the first polymer layer, the bond inhibiting sheet defining voids where the tensile layer and the first polymer layer oppose one another, the voids defined by a plurality of apertures formed through the sheet;
   locating an additional bond inhibiting sheet between the tensile layer and the second polymer layer, the additional bond inhibiting sheet defining voids where the tensile layer and the second polymer layer oppose one another, the voids of the additional bond inhibiting sheet being defined by a plurality of apertures formed through the additional bond inhibiting sheet and being offset from the apertures of the bond inhibiting sheet;
   compressing the first polymer layer, the second polymer layer, and the tensile layer between the mold portions to form a plurality of discrete and spaced bonds between the tensile layer and the first polymer layer within the voids defined by the bond inhibiting sheet and between the tensile layer and the second polymer layer;
   bonding the first polymer layer to the second polymer layer around a periphery spaced from the tensile layer to form a chamber having an interior void;
   pressurizing the interior void to space areas of the tensile layer located between the bonds from the first polymer layer and the second polymer layer; and
   incorporating the chamber into a sole structure of the article of footwear.

2. The method of claim 1, wherein the tensile layer has a substantially planar configuration.

3. The method of claim 1, wherein the tensile layer includes a textile material.

4. The method of claim 3, wherein the textile material is selected from a group consisting of a textile webbing and a textile mesh.

5. The method of claim 1, wherein the plurality of bonds include thermal bonds.

6. The method of claim 1, wherein the bond inhibiting sheet is integrated with one of the first polymer layer and the tensile layer.

7. The method of claim 1, wherein the step of compressing additionally forms an unbonded portion of the tensile layer substantially surrounding the plurality of bonds.

8. The method of claim 1, further comprising forming the tensile layer from a sheet having a single layer including a first side that engages the first polymer layer and a second side that engages the second polymer layer, the second side being disposed on an opposite side of the sheet forming the tensile layer than the first side.

9. The method of claim 1, wherein incorporating the chamber into a sole structure of the article of footwear includes incorporating the bond inhibiting sheet into the sole structure of the article of footwear.

10. A method of manufacturing an article of footwear, the method comprising:
    locating a first polymer layer, a second polymer layer, and a tensile layer between two mold portions;
    locating a first bond inhibiting sheet between the first polymer layer and the tensile layer;
    locating a second bond inhibiting sheet between the second polymer layer and the tensile layer;
    extending one of the first polymer layer and the tensile layer through at least one first aperture formed through the first bond inhibiting sheet;
    extending one of the second polymer layer and the tensile layer through at least one second aperture formed through the second bond inhibiting sheet, the at least one second aperture being offset from the at least one first aperture;
    bonding the first polymer layer to the tensile layer at the at least one first aperture to form a first bond between the tensile layer and the first polymer layer;
    bonding the second polymer layer to the tensile layer at the at least one second aperture to form a second bond between the tensile layer and the second polymer layer;
    bonding the first polymer layer to the second polymer layer around a periphery spaced from the tensile layer to form a chamber having an interior void;
    pressurizing the interior void; and
    incorporating the chamber into a sole structure of the article of footwear.

11. The method of claim 10 wherein pressurizing the interior void includes creating a first gap between the first polymer layer and the tensile layer adjacent to the first bond and a second gap between the second polymer layer and the tensile layer adjacent to the second bond.

12. The method of claim 10, wherein locating the second bond inhibiting sheet includes offsetting the at least one second aperture from the at least one first aperture of the first bond inhibiting sheet in a direction extending substantially parallel to a longitudinal axis of the tensile layer.

13. The method of claim 10, wherein pressurizing the interior void includes creating a first gap between the first polymer layer and the tensile layer adjacent to the first bond.

14. The method of claim 10, further comprising compressing the first polymer layer, the second polymer layer, and the tensile layer between the mold portions.

15. The method of claim 14, wherein compressing the first polymer layer, the second polymer layer, and the tensile layer between the mold portions extends the one of the first polymer layer and the tensile layer through the at least one first aperture formed through the first bond inhibiting sheet and bonds the first polymer layer to the tensile layer to form the first bond.

16. The method of claim 10, wherein locating the first bond inhibiting sheet includes integrating the first bond inhibiting sheet with the first polymer layer.

17. The method of claim 10, wherein incorporating the chamber into a sole structure of the article of footwear includes incorporating the bond inhibiting sheet into the sole structure of the article of footwear.

\* \* \* \* \*